(12) United States Patent
Kwon et al.

(10) Patent No.: US 11,880,209 B2
(45) Date of Patent: Jan. 23, 2024

(54) ELECTRONIC APPARATUS AND CONTROLLING METHOD THEREOF

(71) Applicant: Samsung Electronics Co., Ltd., Suwon-si (KR)

(72) Inventors: Soonbeom Kwon, Suwon-si (KR); Dodam Kim, Suwon-si (KR); Hyunki Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 17/208,231

(22) Filed: Mar. 22, 2021

(65) Prior Publication Data

US 2021/0356972 A1 Nov. 18, 2021

Related U.S. Application Data

(60) Provisional application No. 63/025,375, filed on May 15, 2020.

(30) Foreign Application Priority Data

Sep. 7, 2020 (KR) .................. 10-2020-0114134

(51) Int. Cl.
*G05D 1/02* (2020.01)
(52) U.S. Cl.
CPC ......... *G05D 1/0274* (2013.01); *G05D 1/0238* (2013.01); *G05D 1/0287* (2013.01)
(58) Field of Classification Search
CPC .. G05D 1/0274; G05D 1/0238; G05D 1/0287; G05B 2219/50391; G06T 7/579
See application file for complete search history.

(56) References Cited

U.S. PATENT DOCUMENTS 10,948,913 B2    3/2021    Lee et al.
10,974,395 B2    4/2021    Seok et al.
(Continued)

FOREIGN PATENT DOCUMENTS

CN           108931977 A    12/2018
DE   10 2015 011 467 A1    5/2016
(Continued)

OTHER PUBLICATIONS

"Walk Control." Walk Control—NAO Software 1.12 Documentation, Aldebaran Robotics, 2011, https://www.cs.cmu.edu/~cga/nao/doc/reference-documentation/naoqi/motion/control-walk.html. (Year: 2011).*

(Continued)

*Primary Examiner* — Kenneth J Malkowski
*Assistant Examiner* — Carville Albert Hollingsworth, IV
(74) *Attorney, Agent, or Firm* — Jefferson IP Law, LLP

(57) ABSTRACT

An electronic apparatus for providing a traversability map of a robot and a controlling method thereof are provided. The electronic apparatus includes a transceiver, a memory configured to store feature information of each of a plurality of robots, and at least one processor configured to receive sensing data obtained by sensing vicinity by at least one external device from the external device from the at least one external device, through the transceiver, generate at least one map with respect to a space where the at least one external device is positioned based on the received sensing data, generate a traversability map for traversal of a robot based on feature information of at least one robot among the plurality of robots and the generated at least one map, and control the transceiver to transmit the traversability map to the robot.

18 Claims, 20 Drawing Sheets

(56) References Cited

U.S. PATENT DOCUMENTS

| | | | |
|---|---|---|---|
| 2005/0187678 A1 | 8/2005 | Myeong et al. | |
| 2006/0241827 A1* | 10/2006 | Fukuchi | G05D 1/0274 701/23 |
| 2009/0149990 A1* | 6/2009 | Myeong | G05D 1/0274 701/25 |
| 2014/0129027 A1 | 5/2014 | Schnittman | |
| 2017/0001311 A1* | 1/2017 | Bushman | A47L 9/2852 |
| 2017/0197311 A1* | 7/2017 | Garcia | G01S 15/931 |
| 2017/0255203 A1 | 9/2017 | Sofman et al. | |
| 2018/0111274 A1 | 4/2018 | Seok et al. | |
| 2018/0239355 A1 | 8/2018 | Lee et al. | |
| 2019/0025838 A1 | 1/2019 | Artes et al. | |
| 2019/0212752 A1 | 7/2019 | Fong et al. | |
| 2019/0370691 A1* | 12/2019 | Chae | A47L 13/60 |
| 2020/0089970 A1* | 3/2020 | Lee | G05D 1/0231 |
| 2020/0114509 A1 | 4/2020 | Lee et al. | |
| 2020/0293049 A1* | 9/2020 | De Castro | G01C 21/206 |
| 2021/0033405 A1 | 2/2021 | Song et al. | |
| 2021/0341940 A1 | 11/2021 | Baik | |

FOREIGN PATENT DOCUMENTS

| | | |
|---|---|---|
| JP | 4352148 B2 | 10/2009 |
| KR | 10-1976241 B1 | 8/2019 |
| KR | 10-2012550 B1 | 8/2019 |
| KR | 10-2019-0119222 A | 10/2019 |
| KR | 10-2043421 B1 | 11/2019 |
| KR | 10-2020-0035930 A | 4/2020 |
| KR | 10-2326077 B1 | 11/2021 |
| WO | 2020/060308 A1 | 3/2020 |

OTHER PUBLICATIONS

Peterson, "The Tile-Based Mapping Transition in Cartography".
Hess et al., "Real-Time Loop Closure in 2D LIDAR SLAM", Stockholm, Sweden, May 16-21, 2016.
Wermelinger et al., "Navigation Planning for Legged Robots in Challenging Terrain", Oct. 9-14, 2016, Daejeon, Korea.
Yang et al., "Survey of Robot 3D Path Planning Algorithms".
International Search Report dated Jul. 16, 2021, issued in International Patent Application No. PCT/KR2021/004525.
Extended European Search dated Dec. 5, 2022; European Appln. No. 21804421.2-1205 / 4070169 PCT/KR2021004525.
European Search dated Aug. 3, 2023; European Appln. No. 21 804 421.2-1205.

* cited by examiner

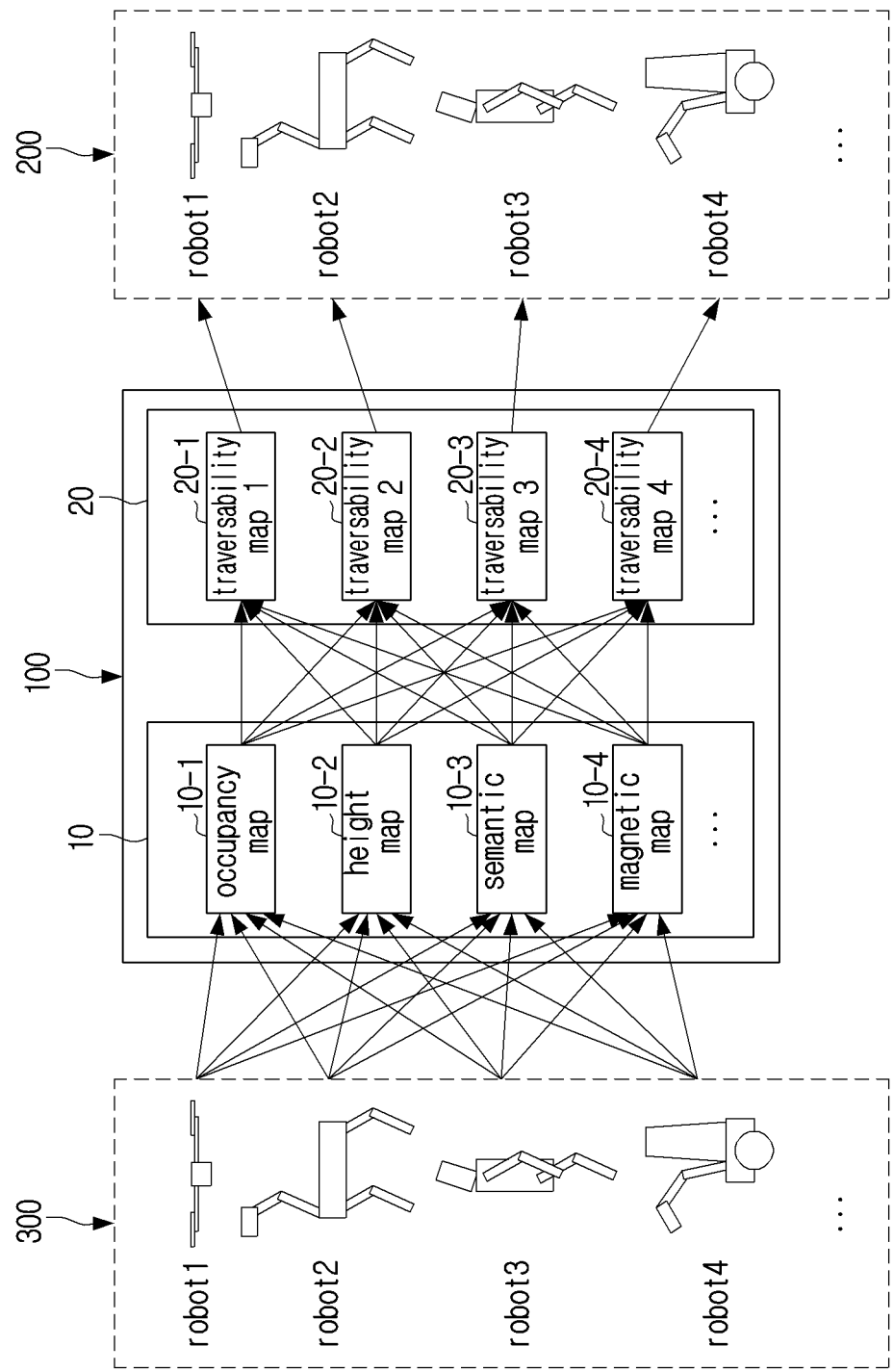

(1)

| method | memory (kB) | elapsed time(s) | |
|---|---|---|---|
| | | generation | update |
| conventional | 720 | 2.7220 | 0.1615 |
| proposed | 190 | 07224 | 0.0303 |

(2)

ELECTRONIC APPARATUS AND CONTROLLING METHOD THEREOF

CROSS-REFERENCE TO RELATED APPLICATION(S)

This application is based on and claims priority under 35 U.S.C. § 119(e) of a U.S. Provisional application Ser. No. 63/025,375, filed on May 15, 2020, in the U. S. Patent and Trademark Office, and under 35 U.S.C. § 119(a) of a Korean patent application number 10-2020-0114134, filed on Sep. 7, 2020, in the Korean Intellectual Property Office, the disclosure of each of which is incorporated by reference herein in its entirety.

BACKGROUND

1. Field

The disclosure relates to an electronic apparatus and a controlling method thereof. More particularly, the disclosure relates to an electronic apparatus providing a traversability map of a robot and a controlling method thereof.

2. Description of Related Art

Recently, development of a robot capable of autonomous traversal (or flight, walking, hereinafter traversal) is actively conducted. In order for a robot to traverse to a destination, it is required to plan a path on a traversability map.

The traversability map can include information reflecting various environmental factors (e.g., obstacles, or the like) affecting the traversal of the robot. A process of adding, deleting, changing, or the like, of information can be performed by specific areas to control the traversability map more efficiently. In that a degree of affecting the environmental factor to the traversal of a robot may vary depending on a feature of a robot, there is an issue of optimizing the traversability map for each robot.

When a change of the environmental factor affecting the traversal of the robot occurs, the traversability map also needs to be updated. At this time, there is an issue of optimizing a range of an area to be updated in the traversability map, in that the changed environmental factor can affect the traversal of a robot not only for a location thereof but also a peripheral area.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus for efficiently generating and managing a traversability map optimized to a robot and a method for controlling thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a transceiver, a memory configured to store feature information of each of a plurality of robots, and at least one processor configured to receive sensing data obtained by sensing vicinity by at least one external device from the external device, through the transceiver, generate at least one map with respect to a space where the at least one external device is positioned based on the received sensing data, generate a traversability map for traversal of a robot based on feature information of at least one robot among the plurality of robots and the generated at least one map, and control the transceiver to transmit the traversability map to the robot.

Feature information of each of the plurality of robots may include information about a size, a height, and a traversal type for each of the plurality of robots, and the at least one map may include at least one of a map including a plurality of cells mapped with probability information about presence of an object, respectively, or a map including a plurality of cells mapped with height information indicative of a height of an object, respectively.

The at least one processor may identify whether the robot is traversable or not in each of the plurality of cells based on information mapped to each of the plurality of cells and feature information of the robot, and generate the traversability map including a plurality of cells mapped with traversability information indicating whether the robot is traversable, respectively.

The at least one processor may receive, from the external device, subsequent sensing data through the transceiver, and update the generated map by updating at least one of height information and probability information mapped to at least one cell among a plurality of cells of the generated map based on subsequent sensing data.

The at least one processor may, based on the generated map and the updated map, update traversability map mapped to at least one cell included in at least one tile among a plurality of tiles in the traversability map that is divided by a plurality of tiles, and control the transceiver to transmit traversability information included in an updated tile to the robot to enable the robot to update the traversability map.

The at least one processor may identify at least one cell of which mapped information is changed by comparing information mapped to the generated map and information mapped to the updated map on a cell unit, identify a first area in a minimum size including at least one cell of which the mapped information is changed in a tile, by each tile of the updated map, identify a second area including the first area and a third area including the second area based on the size of the robot, identify traversability information of each of the plurality of cells of the second area based on a size of the robot and information mapped to each of the plurality of cells of the third area, and update traversability information mapped to at least one cell included in the at least one tile based on the identified traversability information.

The at least one processor may identify at least one tile including at least one cell of the second area among the tile and at least one tile in a vicinity of the tile, and update traversability information mapped to at least one cell of the identified tile based on the identified traversability information.

At least one map may include at least one of a map including a plurality of cells mapped with each of information about a zone of each of the plurality of cells or a map including a plurality of cells mapped with each of information a direction and intensity of magnetic field of each of the plurality of cells.

The traversal type may be at least one of a wheel type, a flight type, or a walking type.

In accordance with another aspect of the disclosure, a method of controlling an electronic apparatus for storing feature information of each of a plurality of robots is provided. The method includes receiving sensing data obtained by sensing vicinity by at least one external device from the external device, generating at least one map with respect to a space where the at least one external device is positioned based on the received sensing data, generating a traversability map for traversal of a robot based on feature information of at least one robot among a plurality of robots and the generated map, and transmitting the generated traversability map to the robot.

The feature information of each of the plurality of robots may include information about a size, a height, and a traversal type of each of the plurality of robots, and the at least one map may include at least one of a map including a plurality of cells mapped with probability information about presence of an object, respectively, or a map including a plurality of cells mapped with height information indicative of a height of an object, respectively.

The generating of the traversability map may include identifying whether the robot is traversable or not in each of the plurality of cells based on information mapped to each of the plurality of cells and feature information of the robot, and generating the traversability map including a plurality of cells mapped with traversability information indicating whether the robot is traversable, respectively.

The method may further include receiving, from the external device, subsequent sensing data through a transceiver, and updating the generated map by updating at least one of height information and probability information mapped to at least one cell among a plurality of cells of the generated map based on the subsequent sensing data.

The method may further include, based on the generated map and the updated map, updating traversability map mapped to at least one cell included in at least one tile among a plurality of tiles in the traversability map that is divided by the plurality of tiles, and transmitting traversability information included in an updated tile to the robot to enable the robot to update the traversability map.

The updating of the traversability map may include identifying at least one cell of which mapped information is changed by comparing information mapped to the generated map and information mapped to the updated map on a cell unit, identifying a first area in a minimum size including at least one cell of which the mapped information is changed in a tile, by each tile of the updated map, identifying a second area including the first area and a third area including the second area based on the size of the robot, identifying traversability information of each of the plurality of cells of the second area based on a size of the robot and information mapped to each of the plurality of cells of the third area, and updating traversability information mapped to at least one cell included in the at least one tile based on the identified traversability information.

The updating of the traversability information may include identifying at least one tile including at least one cell of the second area among the tile and at least one tile in a vicinity of the tile, and updating traversability information mapped to at least one cell of the identified tile based on the identified traversability information.

The at least one map may include at least one of a map including a plurality of cells mapped with information about a zone of each of the plurality of cells or a map including a plurality of cells mapped with information about a direction and an intensity of magnetic field of each of the plurality of cells.

The traversal type may be at least one of a wheel type, a flight type, or a walking type.

According to various embodiments, an electronic apparatus which can efficiently generate and manage a traversability map optimized to a robot and a controlling method thereof can be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2B is a diagram illustrating an operation of an electronic apparatus according to an embodiment of the disclosure;

The same reference numerals are used to represent the same elements throughout the drawings.

DETAILED DESCRIPTION

Figure 1:
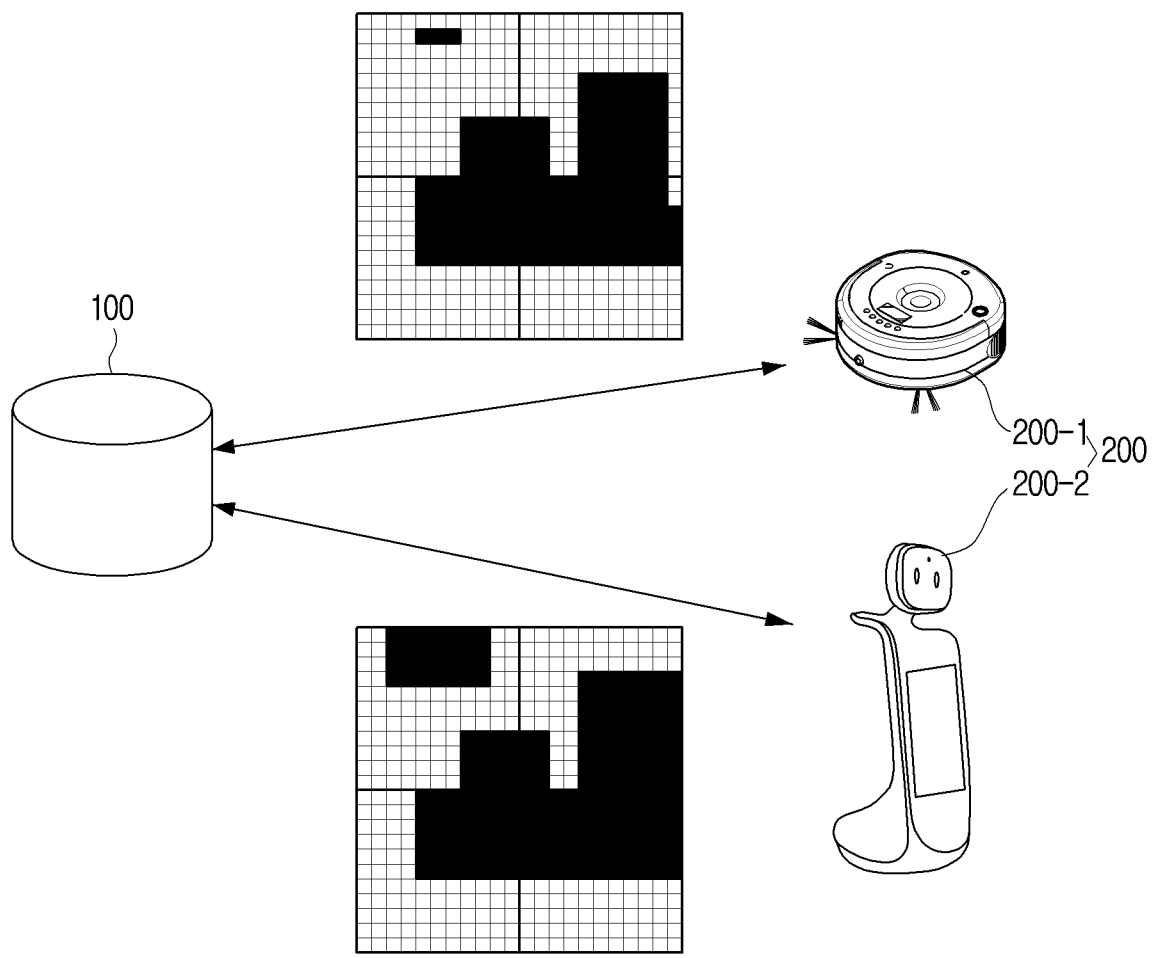
FIG. 1 is a diagram illustrating a system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

However, it should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar constituent elements throughout.

Terms such as "first" and "second" used in various example embodiments may modify various elements regardless of an order and/or importance of the corresponding elements, may be used to distinguish one element from another, and does not limit the corresponding elements.

In the description, expressions such as "A or B," "at least one of A or/and B," or "one or more of A or/and B" may include all possible combinations of the items that are enumerated together. For example, the term "at least one of A [or/and] B" means (1) including at least one A, (2) including at least one B, or (3) including both at least one A and at least one B.

A singular expression includes a plural expression, unless otherwise specified. It is to be understood that the terms such as "comprise" or "include" are used herein to designate a presence of a characteristic, number, operation, element, component, or a combination thereof, and not to preclude a presence or a possibility of adding one or more of other characteristics, numbers, operations, elements, components or a combination thereof.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the other element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

FIG. 1 is a diagram illustrating a system according to an embodiment of the disclosure.

Referring to FIG. 1, a system 1 according to an embodiment may include an electronic apparatus 100 and a robot 200. The electronic apparatus 100 and the robot 200 may be connected to each other through network.

The electronic apparatus 100 may manage (e.g., generate, update, modify, delete, etc.) the traversability map of various robots 200. The electronic apparatus 100 can transmit the traversability map of a particular robot to the corresponding robot among the traversability map of the various robots 200.

For this, the electronic apparatus 100 may be implemented with a server device, in an exemplary embodiment, and the electronic apparatus 100 may include at least one of a robot, desktop personal computers (PCs), laptop PCs, workstations, smartphones, tablet PCs, mobile phone, a portable digital assistant (PDA), a portable multimedia player (PMP), a wearable device, or a home appliance. A wearable device may include any one or any combination of the accessory type (e.g., as a watch, a ring, a bracelet, a bracelet, a necklace, a pair of glasses, a contact lens or a head-mounted-device (HMD)); a fabric or a garment-embedded type (e.g., a skin pad or a tattoo); or a bio-implantable circuit. The home appliance may be, for example, a television, a digital video disc (DVD) player, audio, refrigerator, cleaner, ovens, microwaves, washing machines, air purifiers, set top boxes, home automation control panels, security control panels, television (TV) box (e.g., SAMSUNG HOMESYNC™, APPLE TV™, or GOOGLE TV™), game consoles (e.g., XBOX™, PLAYSTATION™), electronic dictionary, electronic key, camcorder, or electronic frame.

The traversability map (TM) is a digital map used for a robot to traverse to a destination, and the traversability map can include at least one cell. A cell may refer to a basic unit of a map representing a particular location (or area) on a real space. For example, a cell may have the same size and shape (e.g., square, triangular, hexagon, polygon, circular, elliptical, etc.) and can be arranged in a grid shape on a map. That is, each cell on the map may correspond to each location (or area) on the real space.

The traversability information can be mapped to each cell included in the traversability map. The traversability information is information indicating whether the robot is at a location capable of traversing or at a location not capable of traversing, identify whether the robot can traverse at a location corresponding to the cell mapped with the traversability information or plan a traversal path of the robot through the traversability information.

The robot 200 can be a device capable of traversing by itself. For example, the robot 200 can be implemented with a robot cleaner (e.g., a first robot 200-1) for removing dust on a floor or the like, and a guide robot (e.g., a second robot 200-2) for providing various information by accessing a user, or the like. In an exemplary embodiment, the robot 200 can be implemented with a device of various types.

The robot 200 can determine (or plan) the traversal path on the traversability map. The robot 200 can traverse according to the traversal path. That is, the traversal path can indicate a location (or point) that the robot 200 needs to pass sequentially to a destination from the current location of the robot 200 as a departure location. For this purpose, the robot 200 can include, for example, a communicator (e.g., a transceiver), a memory, a sensor, a driver, or the like. The communicator may include a circuit for communicating with the electronic apparatus 100 in a diverse manner and may receive a traversability map from the electronic apparatus 100. The memory can store the received traversability map. The sensor can include a circuit for obtaining various types of sensing data, for example, the sensor can obtain at least one of a location of the robot 200, an image of a peripheral environment of the robot 200, or a distance from an object. The driver may include various driving devices according to the traverse type of the robot 200 and a power supply unit for supplying energy to the driving device.

Specifically, the robot 200 can identify a cell corresponding to a departure location or a destination (or an arrival location) from the traversability map received from the electronic apparatus 100. The cell corresponding to the departure location is a cell indicating the location of the robot 200 among the cells included in the traversability map, and the cell corresponding to the destination can be a cell indicating the location of the destination among the cells included in the traversability map.

The robot 200 can identify the location of the robot 200 as a departure location and identify the destination. For example, the robot 200 can identify the location of the robot 200 through a sensor provided on the robot 200 (e.g., a global positioning system (GPS), an inertial measurement unit (IMU)), or an external device (e.g., a communication device for a three-side measurement, a sensing device that senses a space in which the robot 200 is located, or the like). The robot 200 can identify a location received according to a user input (e.g., a touch input, or the like), a peripheral location of a user calling the robot 200, or any location as a destination. The robot 200 can identify a cell corresponding to a location of the robot 200 and a cell corresponding to a destination among the cells included in the traversability map.

The robot 200 can determine (or plan) an area including a cell corresponding to a departure location and a cell corresponding to a destination, among the cells in which the robot 200 which is identified based on the traversal information of the traversability map can traverse as a traversal path. At this time, various path searching algorithms can be used, such as an algorithm for searching a traversal path of a shortest distance, an algorithm for searching a path to minimize the change in the direction of traversal, or the like.

In this case, the robot 200 can traverse to a destination along the traversal path. Specifically, the robot 200 may periodically determine a location of the robot 200 and a cell corresponding to the location of the robot 200, and adjust the traversal direction of the robot 200 so as to face a position corresponding to a cell (a cell adjacent to the cell corresponding to the position of the robot 200) of a next order of a cell corresponding to the location of the robot 200 among the cells included in the traversal path.

The electronic apparatus 100 according to one embodiment can provide a traversability map based on various feature information of the robot 200 to the robot 200. The feature information of the robot 200 is information indicating feature such as a shape of the robot 200 (e.g., the size of the robot 200, the height of the robot 200, or the like), the traversal type of the robot 200 (e.g., wheel type, travel type, flight type, or the like), or the like. The feature of the robot 200 can affect the traversable area of the robot 200, for example, traversal of the robot is not possible for an area having a size which is less than or equal to the size of the robot 200 (that is, an area where an object is not present). When an environmental change of a space corresponding to the traversability map is detected, the electronic apparatus 100 can update a portion of the traversability map based on the position where the environmental change of the space is detected. This is to improve the efficiency of resources by designating and updating a cell affected by the environmental change among the total cells included in the traversability map.

The embodiment will be further described with reference to the attached drawings.

Figure 2A:
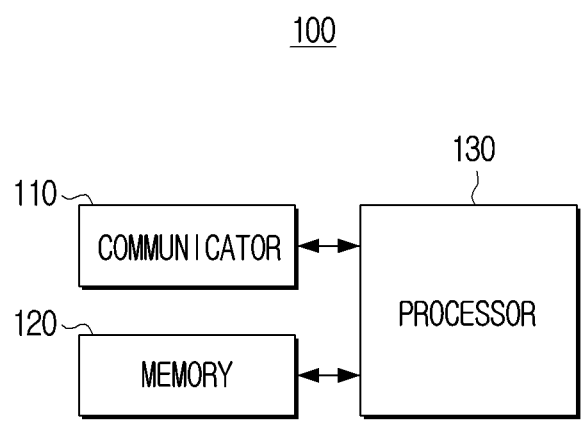
FIG. 2A is a block diagram illustrating a configuration of an electronic apparatus according to an embodiment of the disclosure.

FIG. 2A is a block diagram illustrating a configuration of an electronic apparatus according to an embodiment of the disclosure.

FIG. 2B is a diagram illustrating an operation of an electronic apparatus according to an embodiment of the disclosure.

Referring to FIGS. 2A and 2B, the electronic apparatus 100 according to an embodiment may include a communicator 110 (e.g., a transceiver), a memory 120, and a processor 130 (e.g., at least one processor).

The communicator 110 can communicate with the robot 200 or the external device 300 to transmit information or receive information. For example, the communicator 110 can receive sensing data or related data from the external device 300 to generate (or update) at least one map 10. The communicator 110 can transmit a traversability map 20 or related data to the robot 200.

The feature information of each of the plurality of robots 200 can be stored in the memory 120. Here, the feature information of each of the plurality of robots 200 can include information on the size, height, and traversal type of each of the plurality of robots 200. The feature information of the individual robot 200 can include the size of the robot 200, the height of the robot 200, and information on the traversal type of the robot 200. However, this is only one embodiment, and the feature information of the robot 200 can include various information that can affect the traversal area of the robot 200.

The processor 130 may receive, from the external device 300, sensing data which is obtained by at least one external device 300 by sensing the vicinity, through the communicator 110, generate at least one map 10 for a space where the external device 300 is located based on the sensing data, generate the traversability map 20 for traversing the robot 200 based on the generated map 10 and the feature information of one robot 200 among the plurality of robots 200, and control the communicator 110 to transmit the generated traversability map 20 to the robot 200.

The processor 130 may receive, from the external device 300, sensing data which is obtained by sensing the vicinity by at least one external device 300, through the communicator 110.

The external device 300 is a device capable of obtaining sensing data by sensing the environment of a surrounding space in which the external device 300 is located. The external device 300 can transmit sensing data to the electronic apparatus 100 through communication. The external device 300 can include a sensor and a communicator. The sensor senses various environments of the surrounding space to obtain sensing data. For example, the sensor may include at least one of a distance sensor (e.g., a radio detection and raging (Radar), a light detection and ranging (Lidar), an ultrasound sensor, or the like), a camera (e.g., a mono camera, a stereo camera, etc.) for obtaining an image of a peripheral space of the external device 300, a depth camera, a geomagnetic sensor, or the like. The communicator may perform communication according to the various communication methods (e.g., Wi-Fi, Bluetooth, ZigBee, Ultra-wideband (UWB), etc.) with the electronic apparatus 100 to transmit sensing data to the electronic apparatus 100, and the communicator may include a circuit corresponding to each communication method.

Referring to FIG. 2B, the external device 300 is a robot separate from the robot 200 for receiving the traversability map 20, but this is for convenience of description, and the external device 300 can be the robot 200 for receiving the traversability map 20. That is, the electronic apparatus 100 may receive the sensing data from the robot 200, generate at least one map 10 based on the received sensing data, and transmit the at least one map 10 and the traversability map 20 of the robot 200 generated based on the feature information of the robot 200 to the robot 200. In addition, the external device 300 may be implemented with other electronic apparatuses other than a robot (e.g., a television (TV), a smartphone, a closed-circuit television (CCTV), a refrigerator, etc.).

The processor 130 may generate (or update) at least one map 10 for the space in which the external device 300 is located based on the sensing data. The map 10 can be generated (or updated) by integrating the sensing data acquired by the one or more external devices 300. This is to improve the accuracy of the map 10 on the basis of the traversability map 20. Accordingly, the embodiment will be described with reference to FIGS. 3 and 4.

Figure 3:
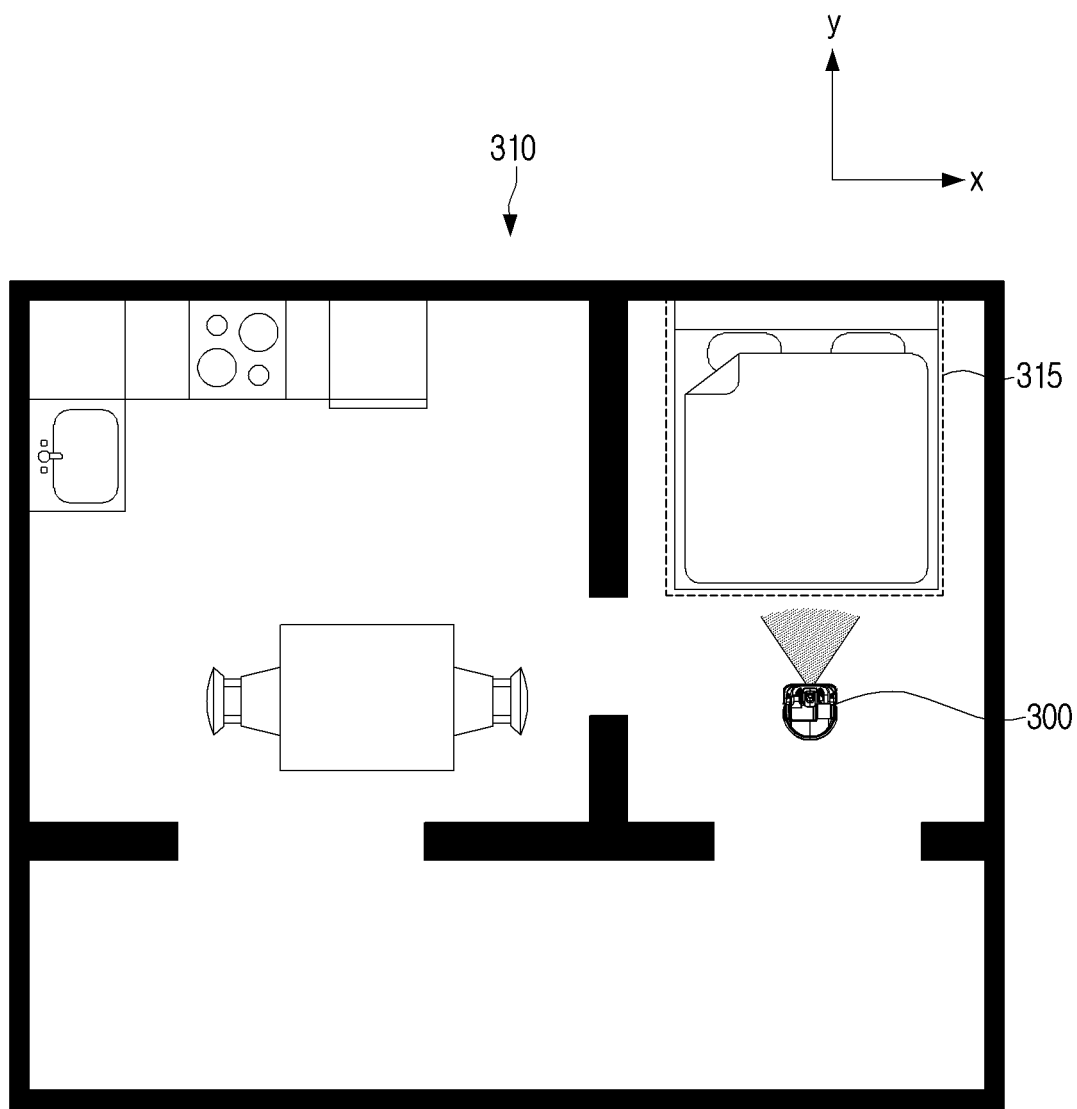
FIG. 3 is a diagram illustrating a space corresponding to a map according to an embodiment of the disclosure.

FIG. 3 is a diagram illustrating a space corresponding to a map according to an embodiment of the disclosure.

Figure 4:
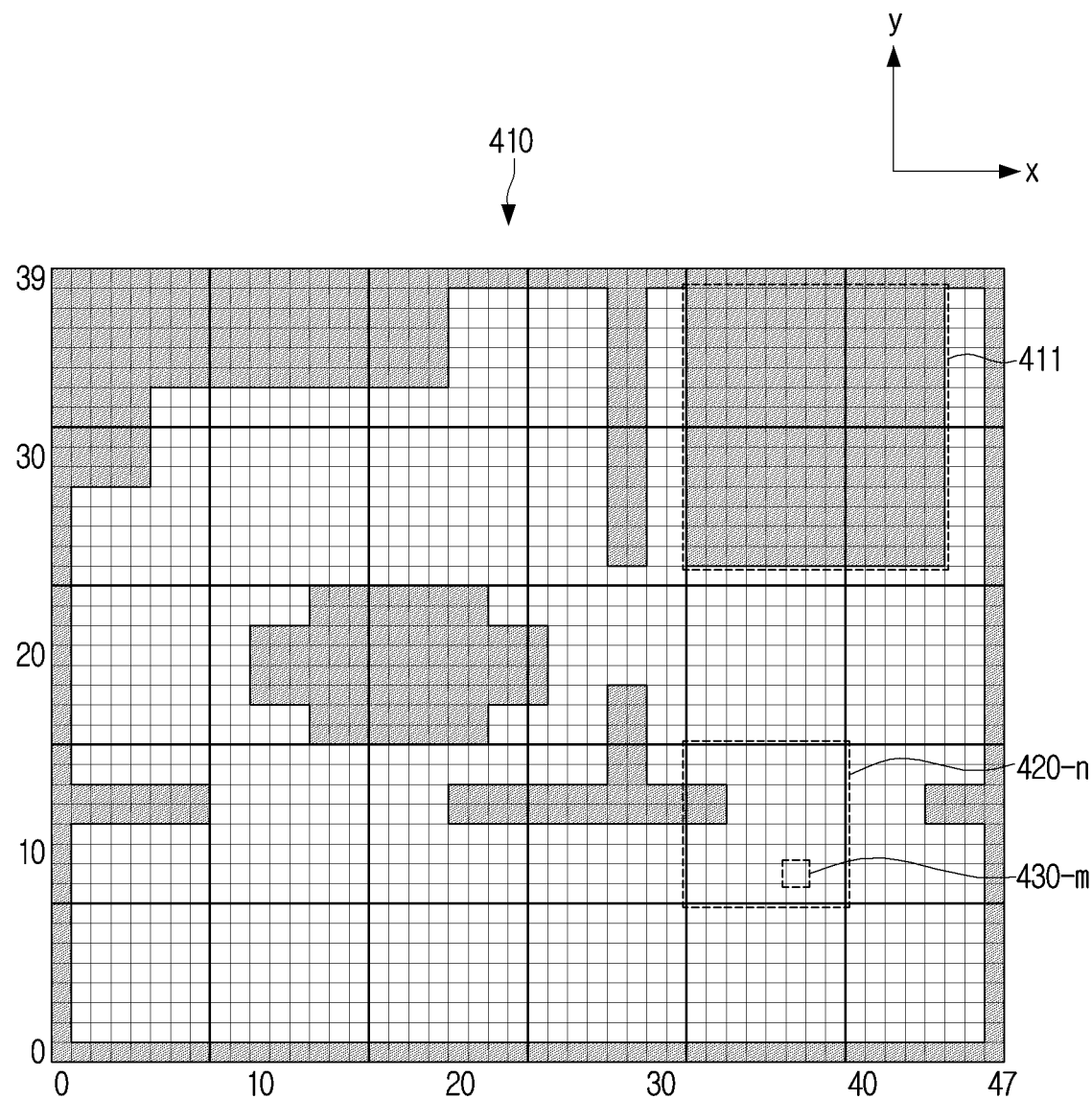
FIG. 4 is a view illustrating a method for generating a map according to an embodiment of the disclosure.

FIG. 4 is a view illustrating a method for generating a map according to an embodiment of the disclosure.

Referring to FIG. 3, for example, the external device 300 may sense a surrounding environment (e.g., an object 315 such as a bed) in a space 310 where the external device 300 is located, obtain the sensing data, and transmit the obtained sensing data to the electronic apparatus 100.

Referring to FIG. 4, the electronic apparatus 100 can generate a map 410 for the space 310 in which the external device 300 is located based on the sensing data (e.g., image, distance information, or the like) received from the external device 300. In this case, the map 410 may include a plurality of cells, and each cell 430-*m* may correspond to a unique location (or area) of the space 310. The map 410 can be divided into a plurality of tiles. Each tile 420-*n* can include at least one cell. That is, the map 410 includes a tile as a sub-concept, and the tile can include a cell as a sub-concept.

A description of tiles and cells can be equally applied to at least one map 10 and the traversability map 20 described below.

Referring to FIG. 2B, the at least one map 10 may include at least one of a first map 10-1 including a plurality of cells mapped with each of probability information in which an object exists, a second map 10-2 including a plurality of cells mapped with each of height information indicating the height (that is, the height of z axis) of the object, a third map 10-3 including a plurality of cells mapped with each of the information on a zone, and a fourth map 10-4 including a plurality of cells mapped with each of a direction of magnetic field and intensity. Each map 10-1 to 10-4 may include a plurality of cells corresponding to the position on the real space, such as the traversability map 20. Thus, cells included in each map 10-1 to 10-4 may be mapped with various information and the maps may be divided into different maps according to information (example: probability information, height information, information on a zone, information related to magnetic field, or the like) mapped to the cells.

The first map 10-1 may include a plurality of cells mapped with each of the probability information in which the object is present. This may be referred to as occupancy map 10-1. The object may mean obstacles such as walls, doors, structures, tables, chairs, carpets, animals that interfere with the traversal of the robot 200. The probability information may represent a probability value (e.g., between a value between 0 and 1 or a value between 0 and 100%) that an object may exist (or may occupy) in the position corresponding to each cell (area on the real space). The occupancy map 10-1 may be composed of a two-dimensional map (i.e., a map representing the position on the xy plane) for a specific height (i.e., the height on the z axis), or a three-dimensional map (i.e., a map representing the location on the xyz space).

The probability information can be calculated based on the sensing data obtained by at least one sensor provided in the external device 300. In one embodiment, a sensor may include a distance sensor (e.g., a radio detection and ranging (RADAR), light imaging detection and ranging (LiDAR), an ultrasound sensor, or the like) that senses the distance from the object by measuring the time when a radio wave (or signal) is reflected and returned, such as a time of flight (ToF) method. In another embodiment, the sensor may include a camera (e.g., a mono camera, a stereo camera, a depth camera, etc.) that senses the light of the surrounding space of the external device 300 by a pixel unit to obtain an image.

For example, the distance sensor may transmit radio wave (e.g., microwave, laser, infrared, light, ultrasonic, etc.) in a particular direction, and by measuring time spent until the transmitted radio wave is reflected by an object existing in a specific direction and returns, may measure the distance from the object existing in the corresponding direction based on the time and speed and of radio wave. In other words, the sensing data obtained by the distance sensor can include information about the direction and distance between the external device 300 and the object.

The processor 130 can map a probability value of a first predetermined value (e.g., 0, 0.3, etc.) to a cell having a distance less than the measured distance among the cells present in the direction in which the radio waves are transmitted at the location of the external device 300 based on the sensing data received from the external device 300. This is because there seems a low probability of an object to be present in a location having a distance that is less than the measured distance. The processor 130 can map a probability value of a second predetermined value (e.g., 1, 0.7, etc.) to a cell having a distance equal to the measured distance among the cells present in the direction in which the radio wave is transmitted at the positon of the external device 300. This is because there may be a high probability that an object is present at a location corresponding to a cell having a measured distance. The processor 130 can receive subsequent sensing data obtained by sensing the surrounding space from the external device 300 through the communicator 110.

The processor 130 can map a probability value which is reduced by a predetermined value (e.g., 0.1, 0.2, etc.) from a previously mapped probability value to a cell having a distance less than the measured distance among the cells present in the direction in which the radio wave is transmitted at the location of the external device 300, based on the subsequent sensing data, and can map a probability value of increasing a predetermined value (e.g., 0.1, 0.2, etc.) to a previously mapped probability value to a cell having the same distance with the measured distance. At this time, the mapped probability value can be a value between 0 and 1. That is, the minimum value may be zero and the maximum value can be one. The process is to prevent the accuracy of the sensing data from being deteriorated due to an error of sensing data.

When the sensing data obtained by various types of sensors are received from the external device 300 to the electronic apparatus 100, the processor 130 can apply a weight to the sensing data according to the type of the sensor to calculate a probability value. For example, assuming the sensing data obtained by the LiDAR and the sensing data obtained by the ultrasound sensor are received from the at least one external device 300, the sensing data obtained by the LiDAR may be multiplied by a preset weight of 0.7, and the sensing data obtained by the ultrasound sensor may be multiplied by a preset weight of 0.3, and the probability value is calculated by summing them.

The occupancy map 10-1 may be classified into a static occupancy map indicating a probability that a non-movable object (e.g., walls, structures, etc.) is present or a dynamic occupancy map indicating the probability that a mobile object (e.g., a door, an animal, etc.) is present, depending on whether an object occupying the cell is movable.

A second map 10-2 may include a plurality of cells mapped with each of height information indicating a height of an object. This may be referred to as the height map 10-2. The height information may indicate the height of an object present in the corresponding cell.

The height information can be calculated based on the sensing data obtained by at least one sensor provided in the external device 300. Here, the sensor may include a distance sensor (e.g., a RADAR, LiDAR, an ultrasound sensor, or the like) which senses the distance from the object by measuring the time when the radio wave (or signal) is reflected and returned, such as a time of flight (ToF) method. However, this is only one embodiment, and the sensor can include various sensors such as a camera (mono, stereo, depth camera, etc.).

The processor 130 can map a predetermined value (e.g., 0) as the height of the call to a cell having a distance less than the measured distance among the cells present in the direction in which the radio waves are transmitted at the location of the external device 300 based on the sensing data (e.g., distance information) received from the external device 300. This is because the cell having a distance less than the measured distance can be viewed as a space in which an object is not occupied. In addition, the processor 130 can map a height value based on the measured distance and the angle in which the radio wave is transmitted to a cell having the same distance with the measured distance, among the cells present in the direction in which the radio waves are transmitted at the location of the external device 300 based on the received sensing data. For example, a height value based on the measured distance and an angle of the direction in which the radio wave is transmitted can be calculated through a trigonometric ratio, or the like.

A third map 10-3 may include a plurality of cells to which information on a zone is mapped. Here, the third map 10-3 may be referred to as a semantic map 10-3. This is to determine whether to traverse the robot 200 in consideration of the feature of the zone mapped to the cell, even if an object is not present in the cell.

The information on a zone can be generated based on sensing data (e.g., images, etc.) obtained by at least one sensor (e.g., a camera, etc.) provided in the external device 300. For example, the processor 130 can input an image obtained through the camera of the external device 300 to an artificial intelligence (AI) model to identify information about the area included in the image. At this time, the AI model can be a model which has an image as input data and is trained to output information about the type of a zone included in an image or a bottom surface of the zone. The processor 130 can map the identified zone information to a cell corresponding to the position of the external device 300 and a capturing direction of the image. Alternatively, the information about the zone can also be input according to the user's operation.

A fourth map 10-4 may include a plurality of cells mapped with information on the direction and intensity of the magnetic field. This can be referred to as a geomagnetic map 10-4. Here, information on the direction and intensity of the magnetic field can be obtained by the geomagnetic sensor provided on the external device 300. The geomagnetic sensor may detect the magnetic field generated by the Earth, and may obtain information on the intensity of the magnetic field and the azimuth (or direction) based on a magnetic north.

The processor 130 may generate (or update) the traversability map 20 for traversing the robot 200 based on the feature information of one robot 200 among a plurality of robots and the generated map 10.

The processor 130 may determine whether the robot 200 is traversal or not in each of the plurality of cells based on the information mapped to each of the plurality of cells and the feature information of a robot.

The feature information of the robot 200 can include the size of the robot 200, the height of the robot 200, and information on the traverse type of the robot 200. Also, the feature information of the robot 200 can further include information about the hardware of the robot 200 (e.g., the type of the sensor embedded in the robot 200, etc.).

According to an embodiment, the processor 130 may determine whether the robot 200 is traversal or not in each of the plurality of cells based on the information mapped to each of the plurality of cells included in the occupancy map 10-1 and the feature information of the robot 200.

The feature information of the robot 200 may include a size of the robot 200. The size of the robot 200 may indicate the distance from a rotation axis to an end of the robot 200 when the robot 200 is rotationally traversal.

A specific method of determining whether the robot 200 is traversal using the mapped information in the occupancy map 10-1 will be described with reference to FIGS. 5 to 7.

In one embodiment, the processor 130 may determine whether the robot is traversal or not in each of the plurality of cells based on the information mapped to each of the plurality of cells included in the height map 10-2 and the feature information of the robot 200.

The feature information of the robot 200 may include the height of the robot 200 or the traverse type of the robot 200.

The height of the robot 200 may indicate the length (example: length in z-axis direction) of the robot 200 in a direction perpendicular to the ground. The traverse type of the robot 200 may be at least one of a wheel type, flight type, or walking type.

Specifically, the wheel type may refer to the manner in which the robot 200 moves through rotation of the wheel. The wheel type robot can include a driving device, a steering device, a brake device, or the like. The driving device is a device for generating power for rotating the wheel, for example, the driving device can be implemented as a gasoline engine, a diesel engine, a liquefied petroleum gas (LPG) engine, an electric motor, or the like, according to a fuel to be used (or energy source). The steering device is a device for controlling the traversing direction of the robot 200. The brake device is a device for decelerating the driving speed of the robot 200 or stopping the robot 200. The flight type refers to the manner in which the robot 200 moves on the ground while flying. The flight-type robot can include a driving device. The driving device is a device to generate power for flight of the robot 200, for example, the driving device can be implemented as a motor for rotating a propeller, or an injection device for spraying high pressure air (or fuel), or the like. The walking type refers to the manner in which the robot 200 moves through the movement of legs. A walking type robot (e.g., two-feet walking robot, three-feet walking robot, four-feet walking robot, etc.) can include a driving device and two or more legs. The two or more legs can support the robot 200. The driving device is a device for generating power to lift up or set down legs, for example, the driving device can be implemented as a motor, an actuator, or the like.

A specific detail of the method for determining whether the robot 200 is traversable using the information mapped to the height map 10-2 will be described with reference to FIGS. 8 to 10B.

In one embodiment, the processor 130 may determine whether the robot 200 is traversable or not in each of the plurality of cells based on the information mapped to each of the plurality of cells included in the semantic map 10-3 and the feature information of the robot 200. Here, the feature information of the robot 200 can include information about the traverse type of the robot 200.

For example, the processor 130 can generate (or update) the traversability map 20 of the robot 200 by mapping the traversability information indicating that the robot 200 is traversable in the cell, when there is a cell mapped with information indicating a zone (example: passageway, or the like) where traversal of the robot 200 is allowed, among a plurality of cells included in the semantic map 10-3. Alternatively, the processor 130 can generate (or update) the traversability map 20 of the robot 200 by mapping traversability information indicating that the robot 200 is not traversable in the cell, when there is a cell mapped with information indicating a zone (e.g., a toilet, etc.) in which the traversal of the robot 200 is prohibited from among the plurality of cells included in the semantic map 10-3.

For another example, when there is a cell mapped with information indicating a bottom surface (example: bottom surface which is wet) of which fractional force is less than a preset value among a plurality of cells included in the semantic map 10-3, the processor 130 may identify whether the traverse type of the robot 200 is a wheel type or walking type, and if it is identified that the traverse type of the robot 200 is a wheel type or walking type, the traversability information indicating that traversal of the robot 200 is not possible is mapped to the cell and the traversability map 20 of the robot 200 can be generated (or updated).

In one embodiment, the processor 130 may determine whether the robot 200 is traversal or not in each of the plurality of cells based on the information mapped to each of the plurality of cells included in the geomagnetic map 10-4.

The feature information of the robot 200 may include information about hardware of the robot 200. The information about the hardware of the robot 200 may be at least one of a sensor embedded in the robot 200, a model of the robot 200, identification information of the robot 200, or the like.

For example, when there is a cell (for example, a cell of which a change amount of direction or intensity of magnetic field is greater than or equal to a preset value) of which a direction or intensity of magnetic field is not constant among a plurality of cells included in the geomagnetic map 10-4, the processor 130 may identify a robot (or a robot using the geomagnetic sensor) including a geomagnetic sensor among a plurality of robots based on the information about hardware of the robot 200, and map the traversability information indicating that the traversal of the robot 200 is not available with the cell to generate (or update) the traversability map 20 of the identified robot.

The processor 130 can generate (or update) a traversability map 20 including traversability information indicating whether the robot 200 is traversable in each of the plurality of cells. Here, the map 10 and the traversability map 20 can be classified into a plurality of tiles, and one or more cells can be included in each tile. That is, the map 10 and the traversability map 20 may include the tiles as a sub-concept, and the tiles can include the cells as a sub-concept. In this case, the traversability map 20 can be generated or updated in a tile unit or a cell unit.

The processor 130 may map traversability information according to a result of determination to each of the plurality of cells included in the traversability map 20 using a result whether the robot 200 is traversable or not in each of the plurality of cells.

In the case where at least one map 10 is plural, when the processor 130 determines that the robot 200 is traversable in a specific cell according to all the maps 10 (AND condition), the traversability information indicating that the robot 200 is traversable in a particular cell included in the traversability map 20 can be mapped. In addition, if the processor 130 determines that the robot 200 is not traversable (OR condition) in a particular cell according to one map 10, the traversability information indicating that the robot 200 is not traversal may be mapped to a specific cell included in the traversability map 20.

For example, if at least one map 10 is the occupancy map 10-1 and the semantic map 10-3, there may be four cases to determine whether the robot 200 for a particular cell is traversable. According to the first example, the determination result according to the occupancy map 10-1 can determine that the robot 200 is traversable in a particular cell, and the determination result according to the semantic map 10-3 can determine that the robot 200 is traversable in a particular cell, in which case the processor 130 can determine that the robot 200 is traversable in the corresponding cell. As a second example, the determination result according to the occupancy map 10-1 can determine that the robot 200 is not traversable in a particular cell, and the determination result according to the semantic map 10-3 can determine that the robot 200 is traversable, in which case the processor 130 can determine that the robot 200 is not traversable in the corresponding cell. According to the third example, the determination result according to the occupancy map 10-1 can be determined such that the robot 200 can traverse in a particular cell, and the determination result according to the semantic map 10-3 can be determined that the robot 200 may not traverse in a particular cell, in which case the processor 130 can determine that the robot 200 cannot traverse in the corresponding cell. As a fourth example, the determination result according to the occupancy map 10-1 can be determined that the robot 200 cannot traverse in a particular cell, and the determination result according to the semantic map 10-3 can be determined that the robot 200 cannot traverse in a particular cell, in which case the processor 130 can determine that the robot 200 cannot traverse in the corresponding cell.

The processor 130 may control the communicator 110 to transmit the generated (or updated) traversability map 20 of the robot 200 to the robot 200.

For example, the processor 130 can generate (or update) the first traversability map 20-1 for the traversal of the first robot 200-1 based on the feature information of the at least one map 10 and the first robot 200-1, and control the communicator 110 to transmit the first traversability map 20-1 to the first robot 200-1. The processor 130 may generate (or update) a second traversability map 20-2 for traversing the second robot 200-2 based on the feature information of the at least one map 10 and the second robot 200-2, and control the communicator 110 to transmit the second traversability map 20-2 to the second robot 200-2.

The electronic apparatus 100 may generate or update one or more maps 10 classified according to the type of the sensing data based on the sensing data received from the one or more external devices 300, generate or update a traversability map 20 indicating the traversability of the robot 200 in consideration of a feature of the robot 200 based on the one or more maps 10, thereby efficiently managing the traversability map 20 of the robot 200 and providing an optimized traversability map 20 according to the individual feature of the robot 200.

The processor 130 according to one embodiment can generate (or update) the traversability map 20 of the robot 200 based on the information mapped to each of the plurality of cells included in the occupancy map 10-1 and the feature information of the robot 200. Accordingly, the disclosure will be described in detail with reference to FIGS. 5 through 7.

Figure 5:
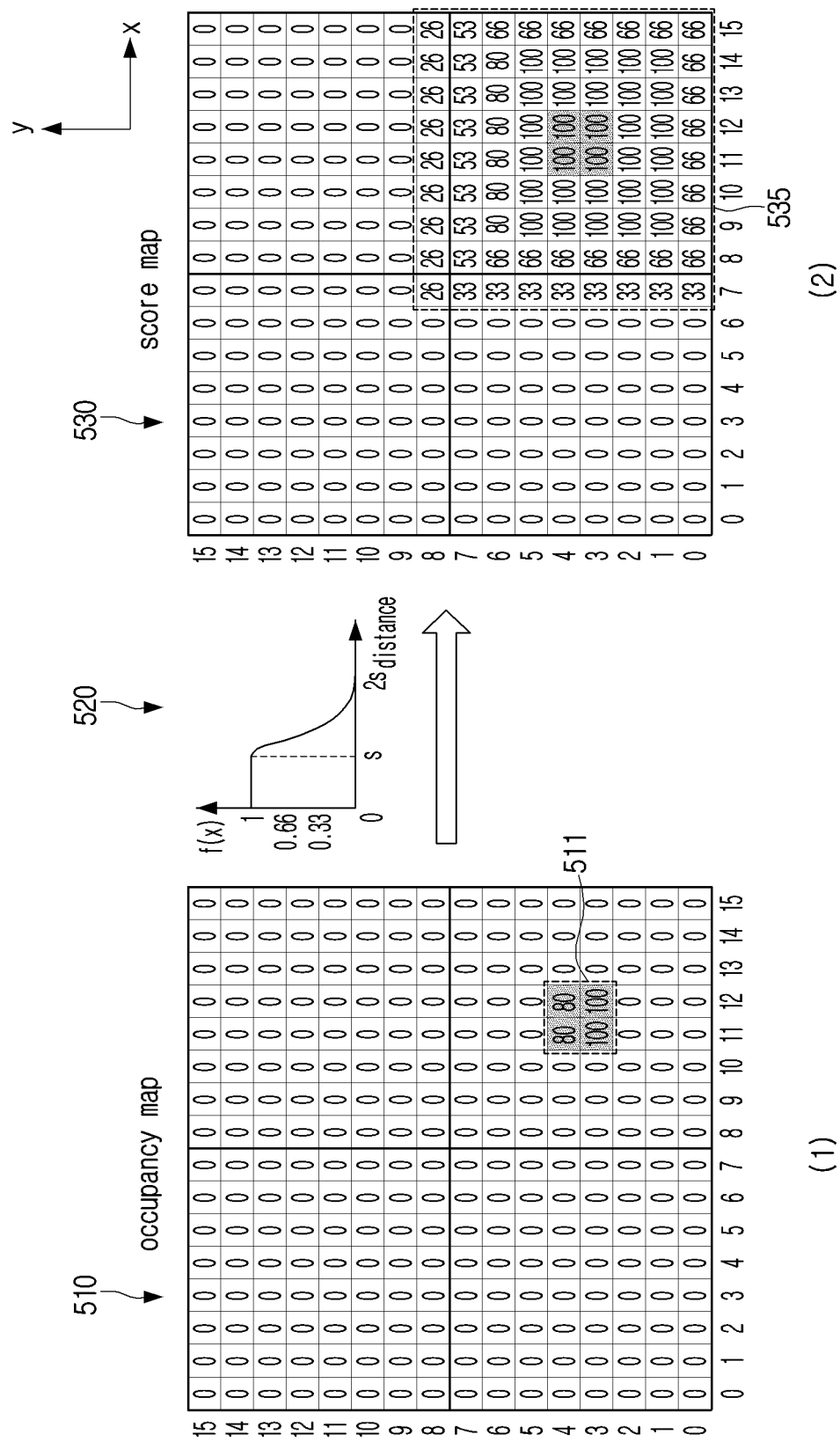
FIG. 5 is a view illustrating a method for generating a score map according to an embodiment of the disclosure.
Figure 6A:
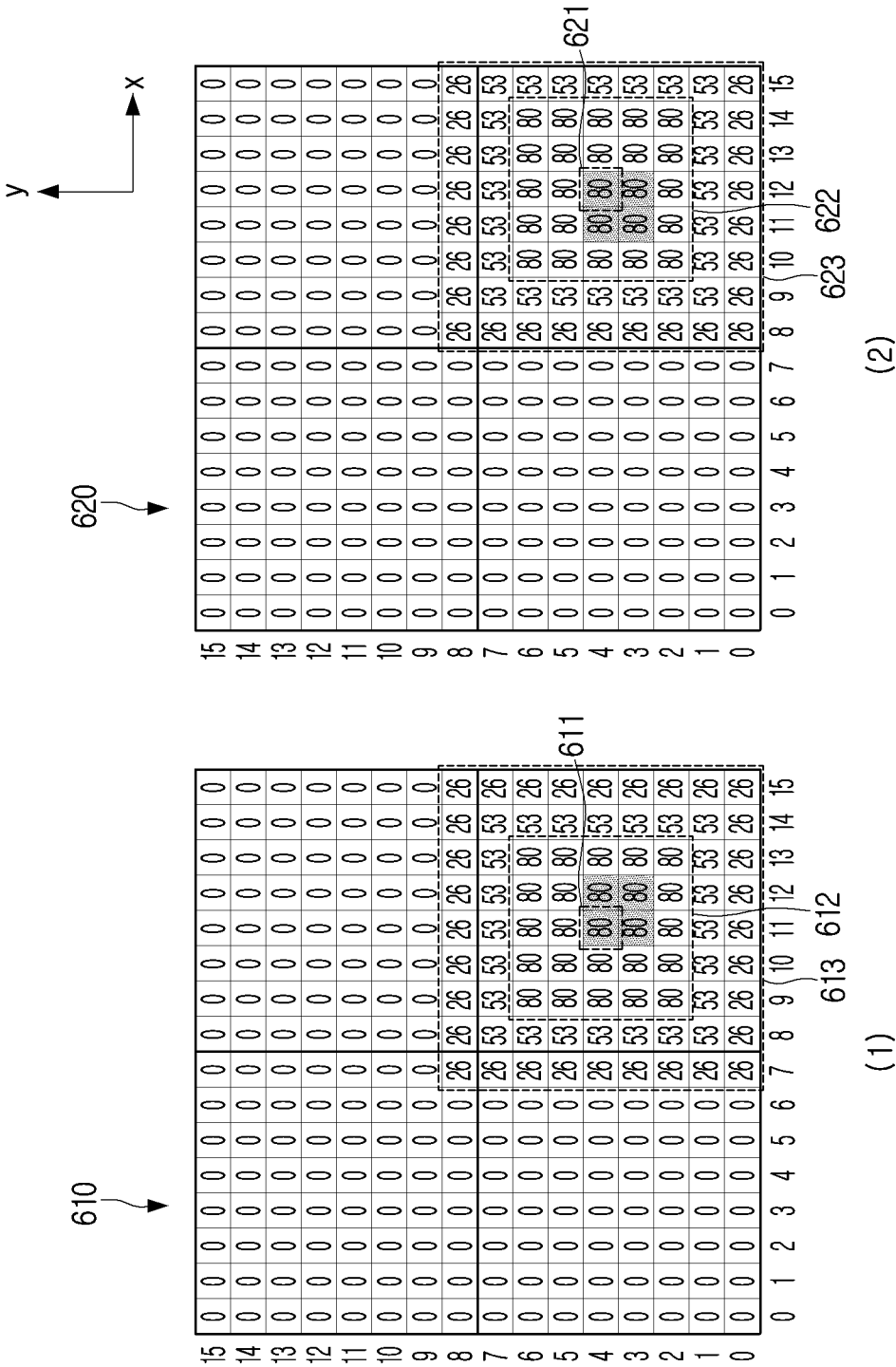
FIG. 6A is a view illustrating a method for generating a score map according to an embodiment of the disclosure.
Figure 6B:
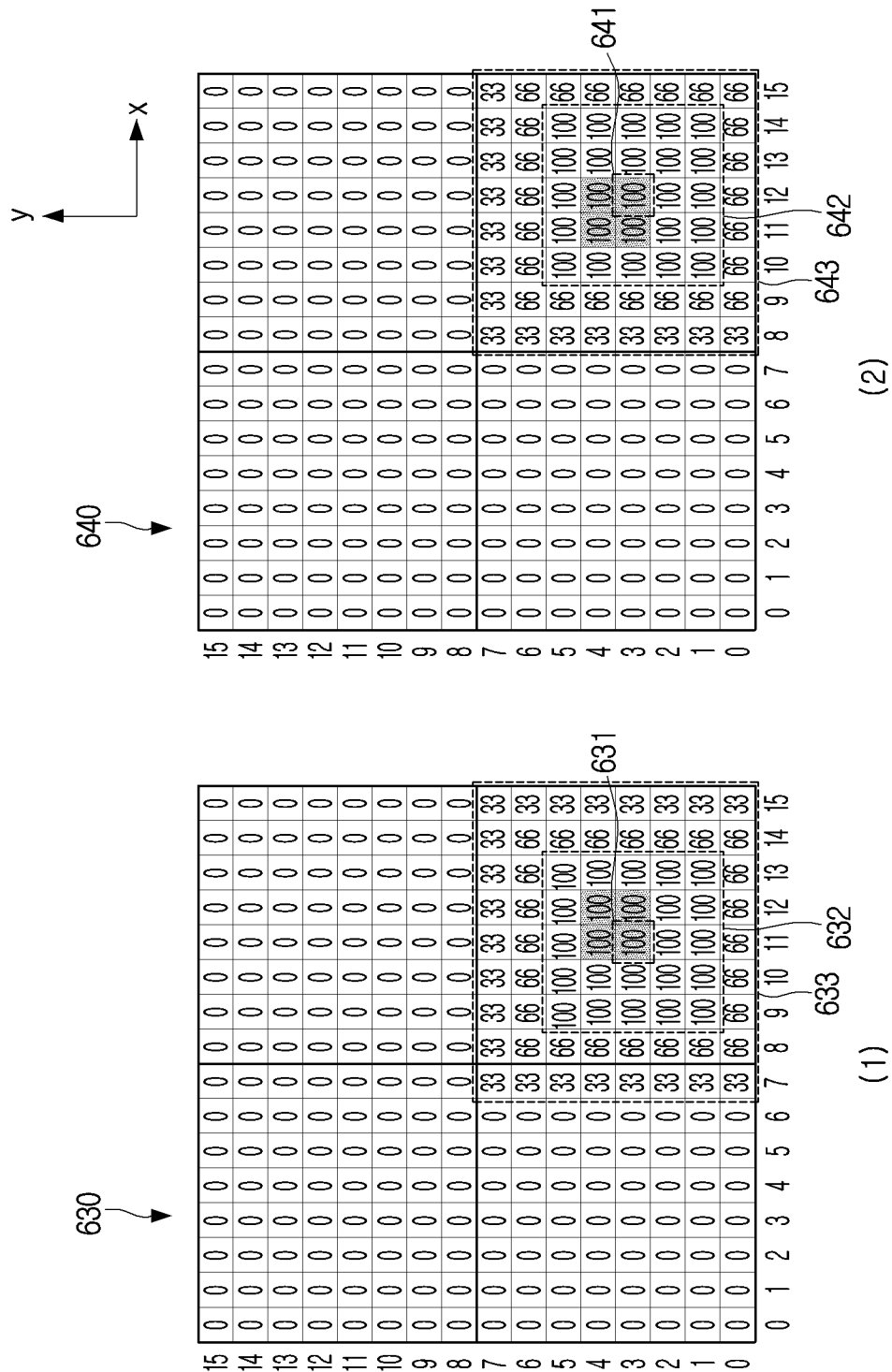
FIG. 6B is a view illustrating a method for generating a score map according to an embodiment of the disclosure.

FIGS. 5, 6A, and 6B are views illustrating a method for generating a score map according to various embodiments of the disclosure.

Referring to FIG. 5, the processor 130 according to one embodiment can calculate a score for each of a plurality of cells based on the probability information mapped to each of the plurality of cells included in an occupancy map 510 and the size of the robot 200. The processor 130 can generate a final score map 530 including a plurality of cells mapped with scores, respectively.

Specifically, the processor 130 can generate the occupancy map 510 based on the sensing data received from the external device 300. Here, a probability value of 100% is mapped to cells (11, 3) and (12, 4) among a plurality of cells included in the occupancy map 510, and a probability value of 80% is mapped to the cell (11, 4) and the cell (12, 4), respectively.

The processor 130 can identify at least one reference cell 511 mapped with a probability value of a predetermined value (e.g., 60%, etc.) or higher, among the plurality of cells included in the occupancy map 510. For example, the processor 130 can calculate a score of a cell 535 adjacent to the reference cell 511 based on a probability value mapped to the reference cell 511 and a score function f(x) 520 based on the size of the robot 200. That is, a value obtained by multiplying the probability value mapped to the reference cell 511 by the score function 520 can be calculated as the score of the adjacent cell 535. At this time, x can indicate the distance of a cell that the adjacent cell 535 is apart from the reference cell 511.

The score function 520 can represent a function relationship that a weight is set based on the distance between the reference cell 511 and the adjacent cell 535. Here, the range of adjacent cells 535 to which weight is applied can be varied according to the size of the robot 200. For example, for the score function 520, in a section from the distance 0 to s (the distance of a cell corresponding to the size of the robot 200), weight 1 can be set, in a section from the distance of s to 2s, the weight can be set to decrease, and in a section of exceeding distance 2s, a weight can be set to 0. However, this is only one embodiment, and the score function 520 can be a modified embodiment which allows various weights to be set according to distances.

Specifically, the embodiment will be described with reference to FIGS. 6A and 6B. The size (s) of a robot is assumed to be a distance corresponding to two cells.

Referring to part (1) of FIG. 6A, the processor 130 may calculate a score of a cell 612, 613 adjacent to a reference cell 611 based on a probability value 80% mapped to the reference cell 611 and a score function 520 and generate a first score map 610 including a plurality of cells mapped to a calculated score. For example, for a cell 612 which is apart from the reference cell 611 by one and two cells, a value of 80%, which is obtained by multiplying a weight value 1 of the score function 6520 by a probability value 80% mapped to the reference cell 611 can be calculated as a score. For a cell 613 in a range of three or four cells apart from the reference cell 611, 53% and 26% which are obtained by multiplying weight values 0.66 and 0.33 of the score function 520 by 80% which is a probability value mapped to the reference cell 611 can be calculated as each score.

Referring to part (2) of FIG. 6A, the processor 130 may calculate a probability value 80% mapped to the reference cell 621 of (12, 4) and the score function 520 to calculate the score of the cells 622, 623 adjacent to the reference cell 621 to generate a second score map 620 including a plurality of cells mapped with the calculated score.

Referring to part (1) of FIG. 6B, the processor 130 can generate a third score map 630 including a plurality of cells mapped to the calculated score by calculating a score of the cell 632, 633 adjacent to the reference cell 631 based on the score function 520 and the probability value 100% mapped to the reference cell 631 of the cell (11, 3). For example, for a cell 632 which is in a range that is apart from the reference cell 631 by 1 or 2, 100% which is a value that is obtained by multiplying 100% which is a probability value mapped to the reference cell 631 by weight 1 of the score function 520 can be calculated as a score. For a cell 633 which is in a range that is apart from the reference cell 631 by three or four cells, a value of 66% and 33%, which is the value obtained by multiplying 100% that is a probability value mapped to the reference cell 631 by weights 0.66 and 0.33, can be calculated as a score.

Referring to part (2) of FIG. 6B, the processor 130 may calculate a score of a cell 642, 643 adjacent to the reference cell 641 based on a probability value 100% mapped to the reference cell 641 of the cell (12, 3) and the score function 520, and generate a fourth score map 640 including a plurality of cells mapped to the calculated score.

The processor 130 may generate a final score map 530 as in part (2) of FIG. 5 by mapping the largest score among the scores mapped to the cell in the same location included in the first to fourth score maps 610 to 640 to the corresponding cell. For example, a score mapped to a cell (8, 7) included in the first to fourth score maps 610 to 640 can be 53%, 26%, 33%, and 33%, respectively. In the final score map 530, a score of 53%, which is the largest score among these scores, can be mapped to the cell (8, 7).

In this case, the processor 130 may generate the traversability map using the final score map 530. A detail will be described with reference to FIG. 7.

Figure 7:
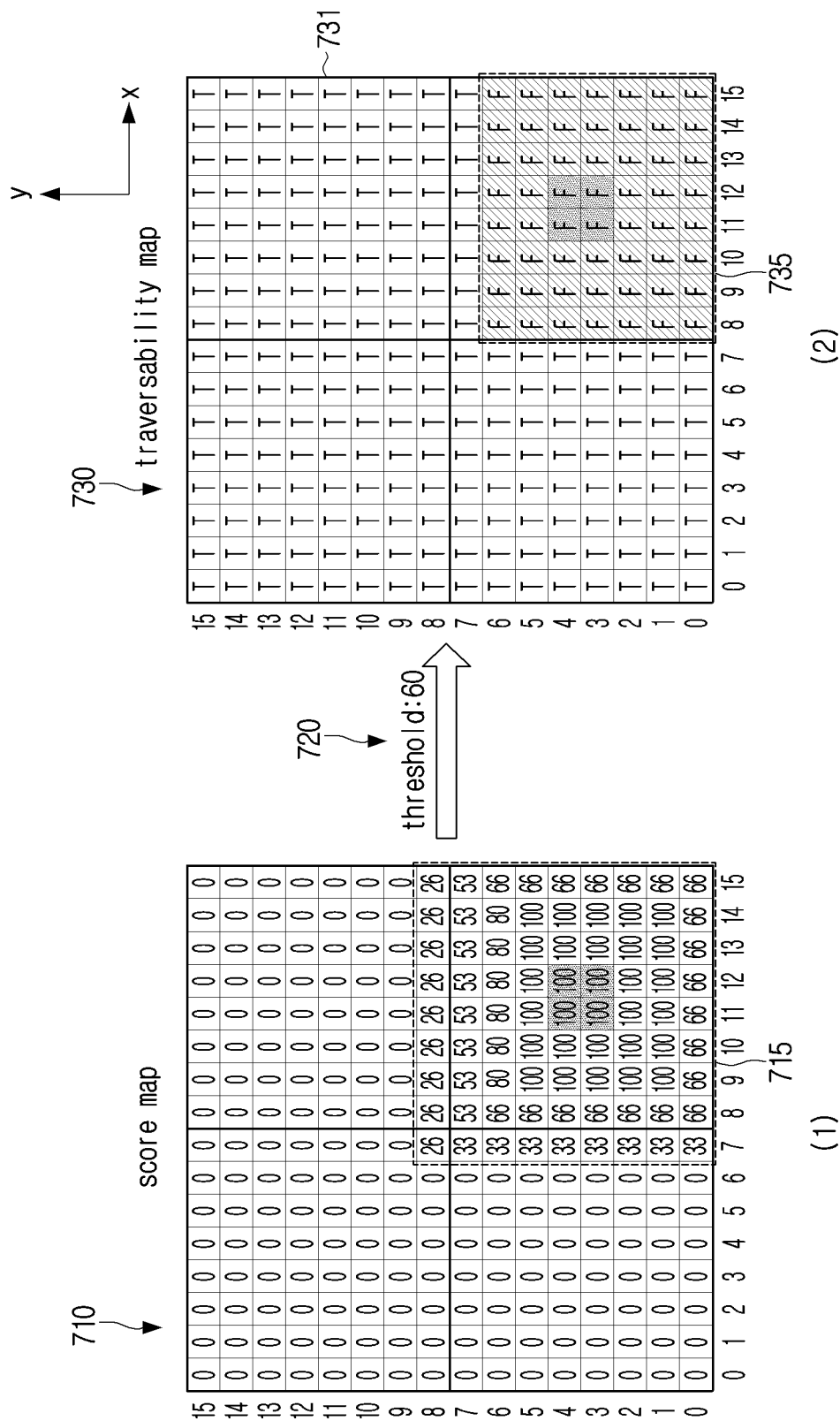
FIG. 7 is a view illustrating a method for generating a traversability map according to an embodiment of the disclosure.

FIG. 7 is a view illustrating a method for generating a traversability map according to an embodiment of the disclosure.

Referring to FIG. 7, in a plurality of cells (e.g., cells 715) included in a final score map 710, the processor 130 may determine a cell of which score is less than a predetermined value 720 (or a threshold value, e.g., 60%) as a cell in which the robot 200 can traverse, and may determine a cell of which a score is greater than or equal to a predetermined value 720 as a cell 735 in which traversal of the robot 200 is not possible.

The processor 130 can generate a traversability map 730 including a plurality of cells mapped to traverse information indicating whether the robot 200 is traversable. For example, the traversability map 730 may include one of information (e.g., T (true 731) or 1, etc.) indicating that the robot 200 can traverse on a cell-by-cell basis or information indicating that traversal of the robot 200 is impossible (e.g., F (false 735) or 0, etc.). In other words, in the traversability map 730, data of T or F (1 or 0, etc.) can have a form of a binary map mapped to each cell. Accordingly, the amount of data to be processed by the robot 200 to traverse through the traversability map 730 can be reduced.

The processor 130 according to one embodiment can generate (or update) the traversability map 20 and 730 of the robot 200 based on the information mapped to each of the plurality of cells included in the occupancy map 10-1 and the height map 10-2 and the feature information of the robot 200. Accordingly, the embodiment will be described with reference to FIGS. 8 to 10B.

Figure 8:
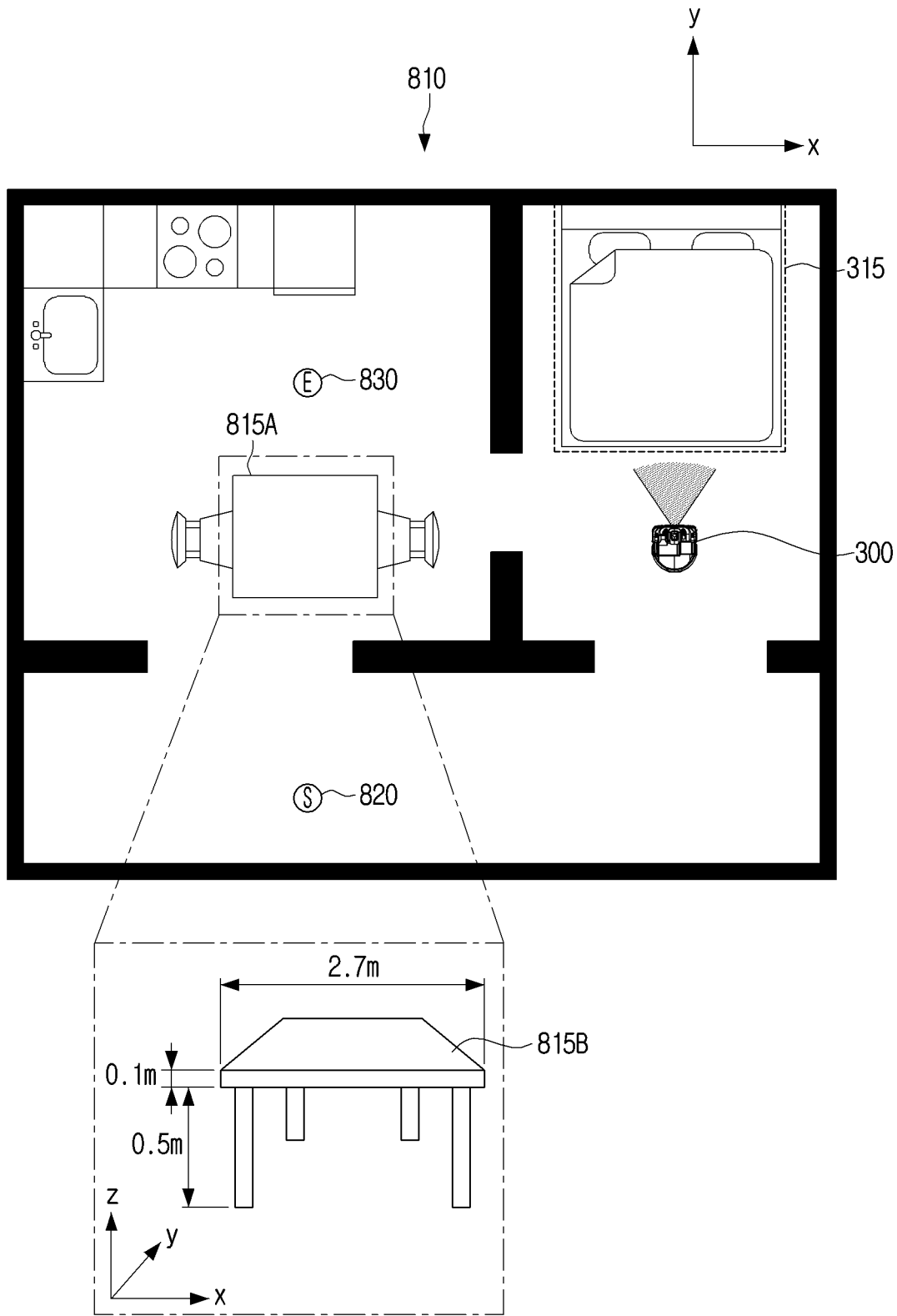
FIG. 8 is a view illustrating a space corresponding to a traversability map according to an embodiment of the disclosure.

FIG. 8 is a view illustrating a space corresponding to a traversability map according to an embodiment of the disclosure.

A space 810 where the robot 200 is to traverse with respect to an x-y plane may be illustrated as FIG. 8.

Referring to FIG. 8, an object 815A, 815B, such as a table, may be present between a departure location 820 and a destination 830 of the robot 200. A method for generating a traversability map considering the feature such as the height of a robot 200 in this case will be described with reference to FIGS. 9A to 9C.

Figure 9A:
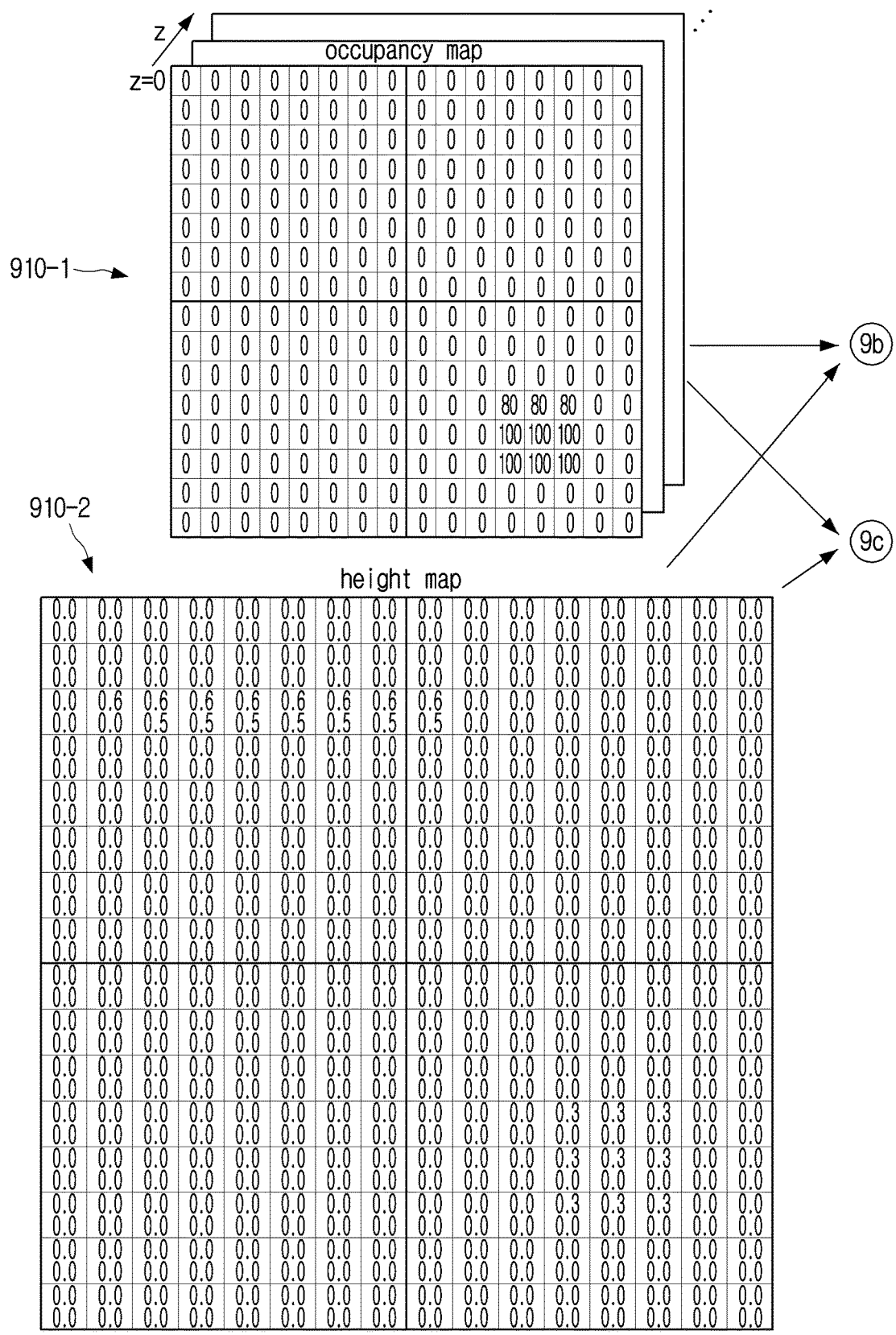
FIG. 9A is a view illustrating a method for generating a traversability map of a robot using an occupancy map and a height map according to an embodiment of the disclosure.
Figure 9B:
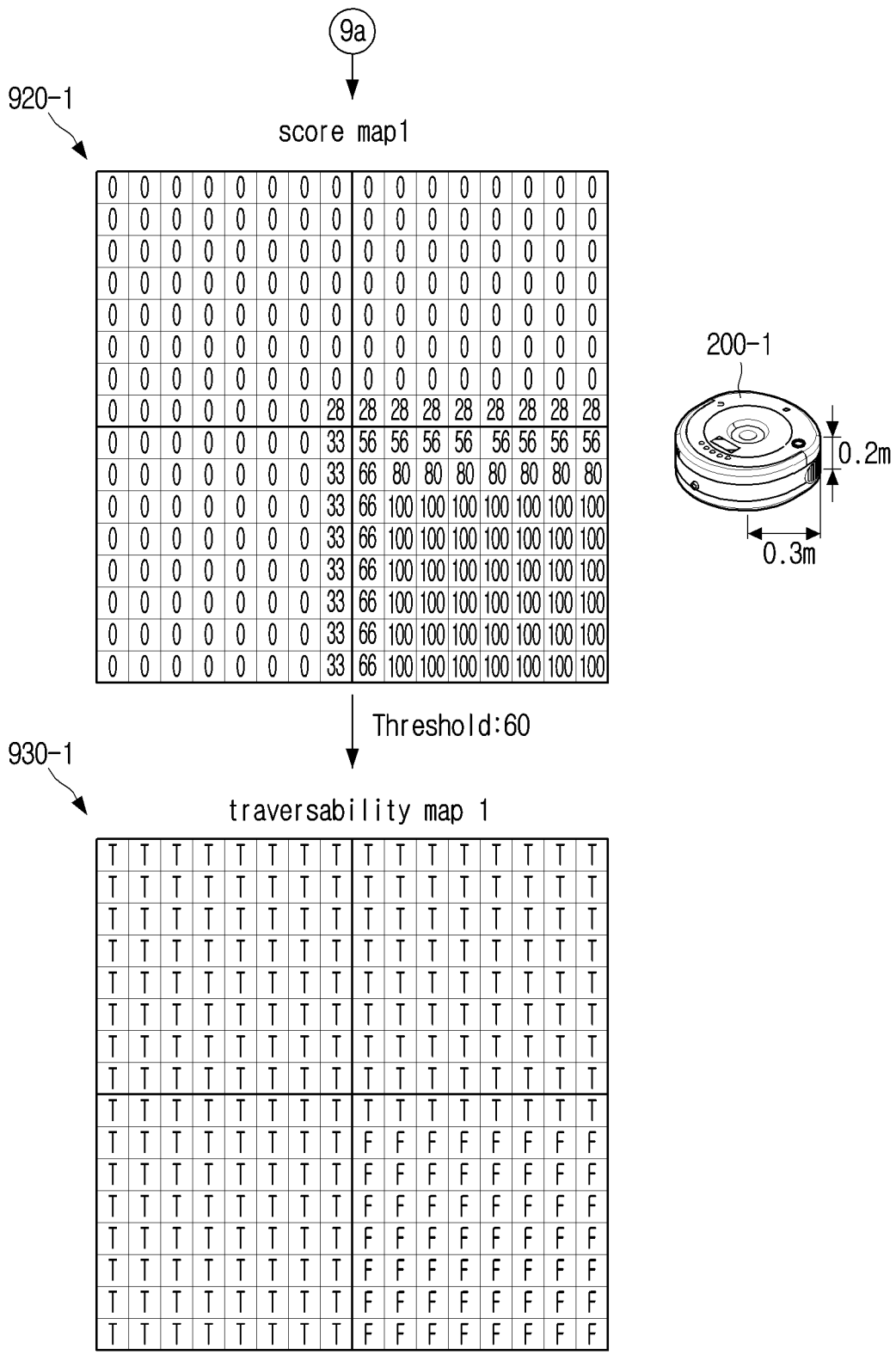
FIG. 9B is a view illustrating a method for generating a traversability map for a first robot according to an embodiment of the disclosure.
Figure 9C:
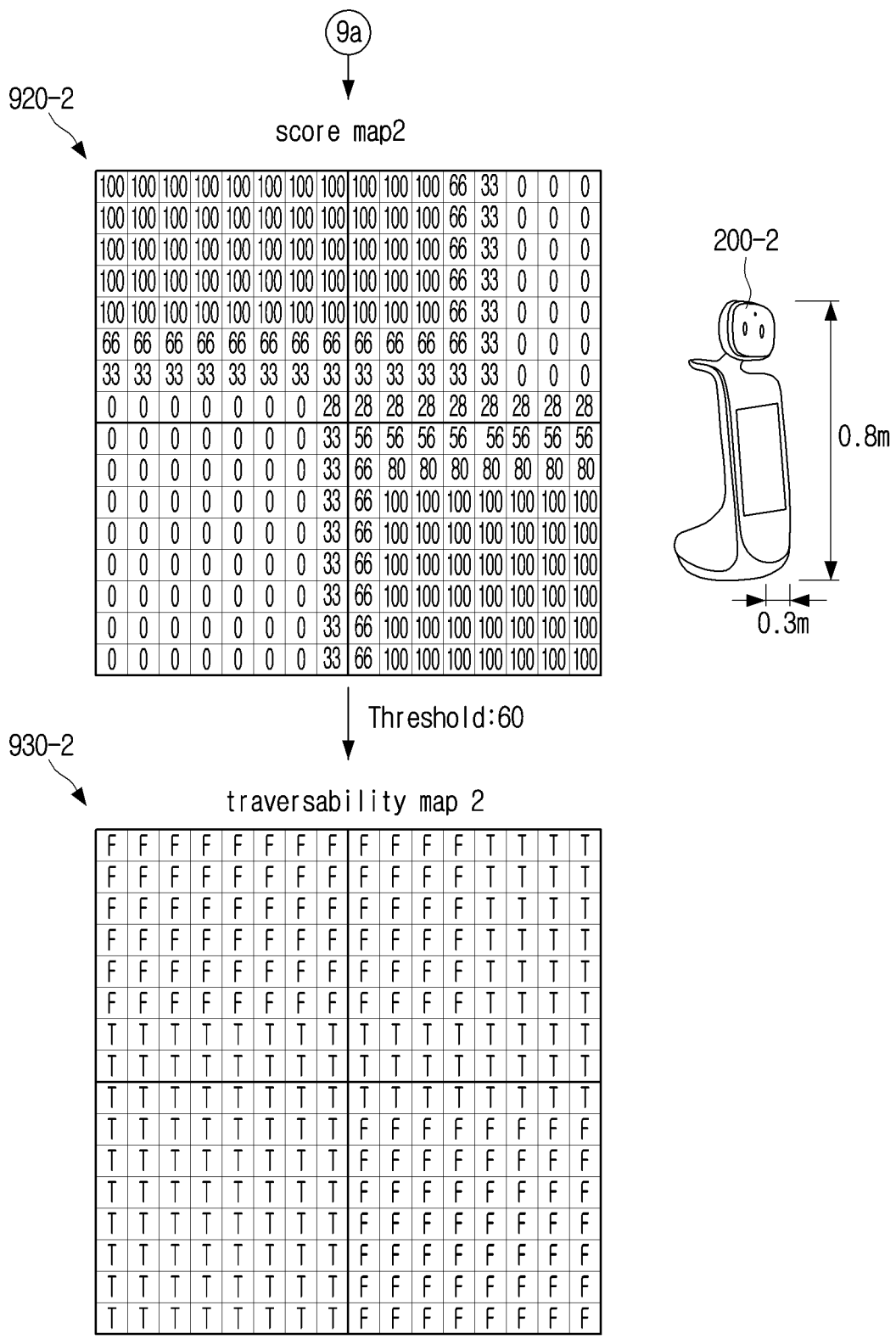
FIG. 9C is a view illustrating a method for generating a traversability map for a second robot according to an embodiment of the disclosure.

FIGS. 9A to 9C are views illustrating a method for generating a traversability map of a robot using an occupancy map and a height map according to various embodiments of the disclosure.

Referring to FIG. 9A, the occupancy map 10-1 and the height map 10-2 according to an embodiment may be the occupancy map 910-1 and the height map 910-2 as illustrated in FIG. 9A. Here, the occupancy map 910-1 and the height map 910-2 are arbitrarily illustrated for convenience of description.

The occupancy map 910-1 may include a plurality of cells corresponding to the position (or area) of the actual space and probability information indicating a probability of presence of an object may be mapped to each of the plurality of cells.

The height map 910-2 may include a plurality of cells corresponding to the position (or area) of the actual space, and the height information indicating the height of an object present in the corresponding cell may be mapped to each of the plurality of cells.

In this case, the height information can include a minimum height and a maximum height of an area where an object is present (or occupied). This can indicate that an object does not exist at a height that is less than the minimum height. This also indicates that an object does not exist at a height exceeding a maximum height. If a value that a minimum height and a maximum height are 0 is mapped to a cell included in the height map 910-2, it may indicate that an object does not exist for an entire height of an area corresponding to the cell (i.e., an unoccupied area).

For example, as illustrated in FIG. 8, if an object 815A, 815B of 0.5 meters to 0.6 meters of height is present in a specific area, height information (minimum height is 0.5 meters, maximum height is 0.6 meters) may be mapped to a cell corresponding to the area in the height map 910-2 as illustrated in FIG. 9A.

In this case, the processor 130 can determine whether the robot 200 is traversable in each cell by combining the occupancy map 910-1 and the height map 910-2. At this time, traversability of the robot 200 can be determined based on the size of the robot 200 and the height of the robot 200 among the feature information of the robot 200.

With reference to FIGS. 9B and 9C, the robot 200 may be divided into a first robot 200-1 and a second robot 200-2 having different heights. As shown in FIG. 9B, the height of the first robot 200-1 is 0.2 meters, the size of the first robot 200-1 is 0.3 meters, and the height of the second robot 200-2 is 0.8 meters, and the size of the second robot 200-2 is 0.3 meters, as shown in FIG. 9C.

In one embodiment, referring to FIG. 9B, the processor 130 can identify the location of the object and the height of the object based on the height information mapped to the cell included in the height map 910-2. The height information mapped to the cell may represent the height of the space occupied by the object (e.g., the height on the z-axis), and the location of the cell can represent the location of the space occupied by the object (e.g., the position on the xy plane).

The processor 130 may identify a height (e.g., 0~0.2 meters) in which the object and the first robot 200-1 are overlapped with each other, based on the height information (e.g., 0~0.3 meters, 0.5~0.6 meters) of the object mapped to the cell included in the occupancy map 910-1 and the height information (e.g., 0.2 meters) of the first robot 200-1.

The processor 130 can generate a first final score map 920-1 based on the size of the first robot 200-1 and the occupancy map corresponding to the height (e.g., 0 to 0.2 meters) that the object and the first robot 200-1 overlap each other, among the plurality of occupancy maps. The first final score map 920-1 may include a plurality of cells arranged on the xy plane.

In one specific embodiment, the processor 130 can integrate an occupancy map corresponding to a height (e.g., 0 to 0.2 meters) where the object and the first robot 200-1 overlap each other. For example, the processor 130 can determine a largest probability value among a plurality of probability values mapped to a particular cell included in the occupancy map by heights as a probability value of the corresponding cell. The processor 130 may calculate a score based on a probability value mapped to a cell included in the integrated map and a size of the first robot 200-1, and generate a first final score map 920-1 including a plurality of cells to which the score is mapped. Here, the method for generating the first final score map 920-1 can be applied to the contents described in FIGS. 5, 6A and 6B, and the redundant descriptions will be omitted.

The processor 130 may generate (or update) a first traversability map 930-1 in which traversability information (e.g., F, etc.) indicating that the first robot 200-1 is not traversable is mapped to a cell exceeding a preset value (e.g., 60%) among the score values mapped to the first final score map 920-1, and to a cell which is less than or equal to a preset value (e.g., 60%) among the score values mapped to the first final score map 920-1, the traversability information (e.g., T, etc.) indicating that the first robot 200-1 is traversable.

The processor 130 may control the communicator 110 to transmit the first traversability map 930-1 to the first robot 200-1.

In another embodiment, referring to FIG. 9C, the processor 130 can identify the location of the object and the height of the object based on the height information mapped to the cell included in a height map 910-2. The height information mapped to the cell represents the height of the space occupied by the object (e.g., the height on the z-axis), and the location of the cell can represent the location of the space occupied by the object (e.g., the position on the xy plane).

The processor 130 may identify the height (e.g., 0-0.3 meters, 0.5-0.6 meters) in which the object and the second robot 200-2 overlap each other based on the height information (e.g., 0-0.3 meters, 0.5-0.6 meters) of the object mapped to the cell included in the occupancy map 910-1 and the height information (e.g., 0.8 meters) of the second robot 200-2.

The processor 130 can generate a second final score map 920-2 based on the occupancy map corresponding to the height (e.g., 0-0.3 meters, 0.5-0.6 meters) in which the object and the second robot 200-2 overlap with each other among the plurality of occupancy maps 910-1 and the size of the second robot 200-1. At this time, the second final score map 920-2 may include a plurality of cells arranged on the xy plane.

In one specific embodiment, the processor 130 can integrate an occupancy map corresponding to a height where the object and the second robot 200-2 overlap each other. For example, the processor 130 can determine a largest probability value among a plurality of probability values mapped to a particular cell included in the occupancy map by heights as a probability value of the corresponding cell. The processor 130 may calculate a score based on a probability value mapped to a cell included in the integrated map and a size of the second robot 200-2, and generate the second final score map 920-2 including a plurality of cells to which the score is mapped.

The processor 130 may generate (or update) a second traversability map 930-2 in which traversability information (e.g., F, etc.) indicating that the second robot 200-2 is not traversable is mapped to a cell exceeding a preset value (e.g., 60%) among the score values mapped to the second final score map 920-2, and the traversability information (e.g., T, etc.) indicating that the second robot 200-2 is traversable is mapped to a cell which is less than or equal to a preset value (e.g., 60%) among the score values mapped to the second final score map 920-2.

The processor 130 may control the communicator 110 to transmit the second traversability map 930-2 to the second robot 200-2.

Figure 10A:
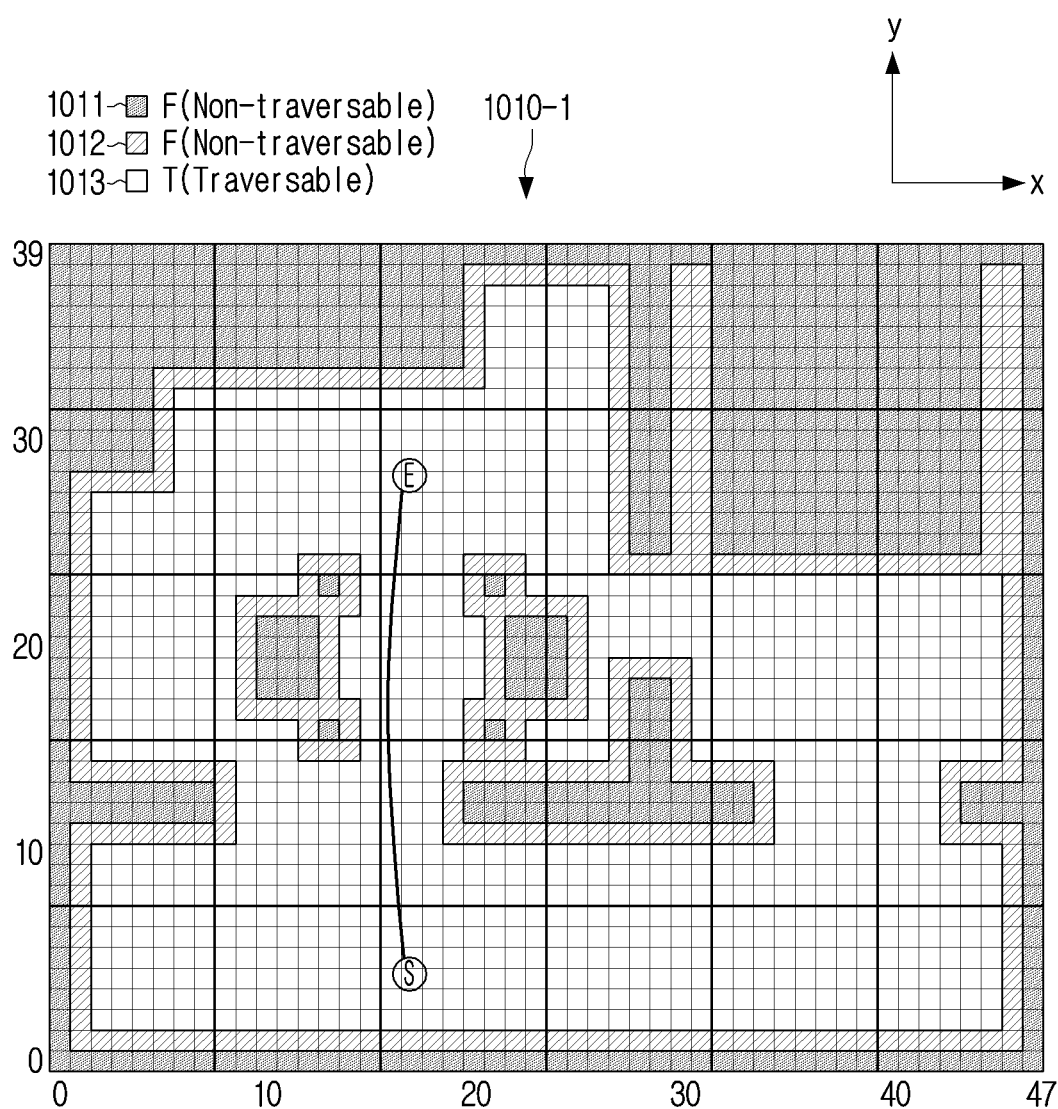
FIG. 10A is a view illustrating a traversability map for a first robot according to an embodiment of the disclosure.
Figure 10A:
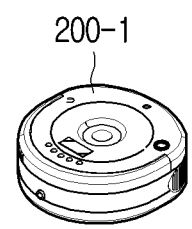
Figure 10B:
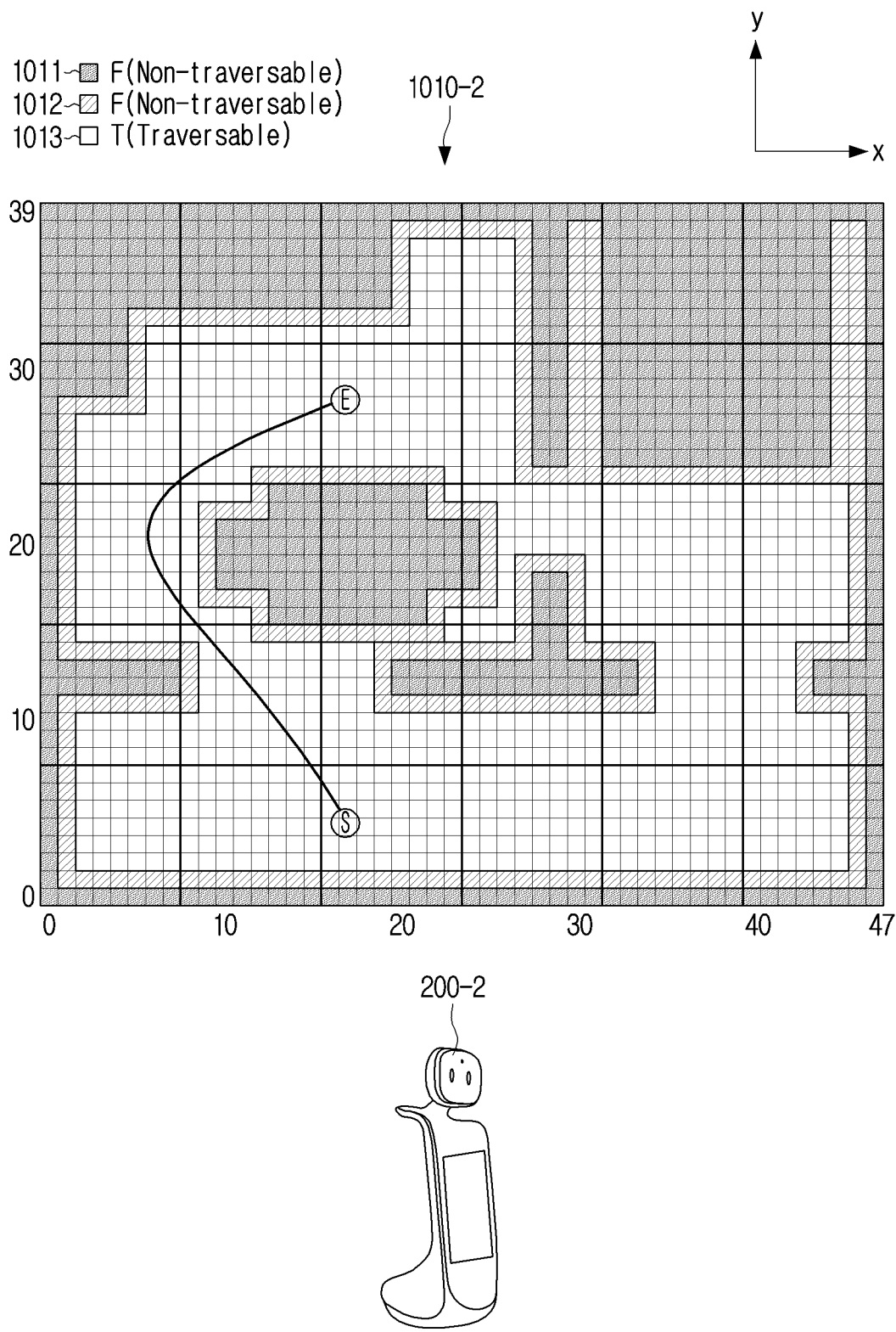
FIG. 10B is a view illustrating a traversability map for a second robot according to an embodiment of the disclosure.

FIGS. 10A and 10B are views illustrating a traversability map for a first robot according to various embodiments of the disclosure.

The second traversability map 1010-1 and 1010-2 illustrated in FIGS. 10A and 10B may include a cell to which traversability information 1011 to 1013 which is identified in consideration of the size and height of the first and second robots 200-1, 200-2, position and size of the object is mapped.

The cell mapped with the first traversability information 1011, 1012 in the first traversability map 1010-1 (or second traversability map 1010-2) can indicate a cell in which the first robot 200-1 (or the second robot 200-2) is not traversable. The first traversability information 1011, 1012 may be classified into traversability information 1011 mapped to a cell in which an object exists, or traversability information 1012 mapped to a cell which may collide with an object present nearby.

A cell to which the second traversability information 1013 is mapped in the first traversability map 1010-1 (or second traversability map 1010-2) can indicate a cell in which the first robot 200-1 (or second robot 200-2) may traverse.

Referring to FIG. 10A, for example, the first robot 200-1 can plan a traverse patch from the departure location (S) to the destination (E) based on the traversability information included in the first traversability map 1010-1 representing a space 810 of FIG. 8 received from the electronic apparatus 100. At this time, the traversability path can be a path for allowing the first robot 200-1 having a height lower than the height of the objects 815A, 815B to pass through the lower space of the objects 815A, 815B.

Referring to FIG. 10B, for example, the second robot 200-2 can plan the traversability path from the departure location (S) to the destination (E) based on the traversability information included in the second traversability map 1010-2, which represents a space 810 of FIG. 8 received from the electronic apparatus 100. At this time, the traversal path can be a path to allow the second robot 200-2 having a height higher than the height of the objects 815A, 815B to detour the surroundings of the objects 815A, 815B.

The electronic apparatus 100 according to an embodiment may provide the traversability map considering a feature of individual robot 200 to the robot 200.

The electronic apparatus 100 according to an embodiment can continuously change (i.e., update) the traversability map 20 as the at least one map 10, such as the occupancy map 10-1, is changed (i.e., updated), considering a dynamic environment.

The processor 130 may receive the subsequent sensing data through the communicator 110. The subsequent sensing data may refer to sensing data received (or obtained) after or immediately after the aforementioned sensing data.

The processor 130 may update information mapped to at least one cell among a plurality of cells of the pre-generated map 10 based on the subsequent sensing data to update the pre-generated map 10. The generated map 10 may be one of the occupancy map 10-1, the height map 10-2, the semantic map 10-3, and the geomagnetic map 10-4, and the updated information may be information about a probability information for the occupancy map 10-1, height information for the height map 10-2, information about an area for the semantic map 10-3, and information about the direction and intensity of the magnetic field for the geomagnetic map 10-4.

The processor 130 can update the traversability information mapped to at least one cell among a plurality of cells of the pre-generated traversability map 20 of the robot 200, based on the feature information of the robot 200, the pre-generated map 10, and the updated map, to update the traversability map 20 of the robot 200. Here, the map 10 and the traversability map 20 can be divided into a plurality of tiles, and one or more cells can be included in each tile. That is, the map 10 and the traversability map 20 may include the tiles as a sub-concept, and the tiles can include the cells as a sub-concept. In this case, the traversability map can be generated or updated in a tile unit or a cell unit. A specific embodiment will be described with reference to FIGS. 11-13.

The processor 130 may control the communicator 110 to transmit the traversability information included in the updated tile to the robot 200. The robot 200 may update the traversability map based on the received information.

Figure 11:
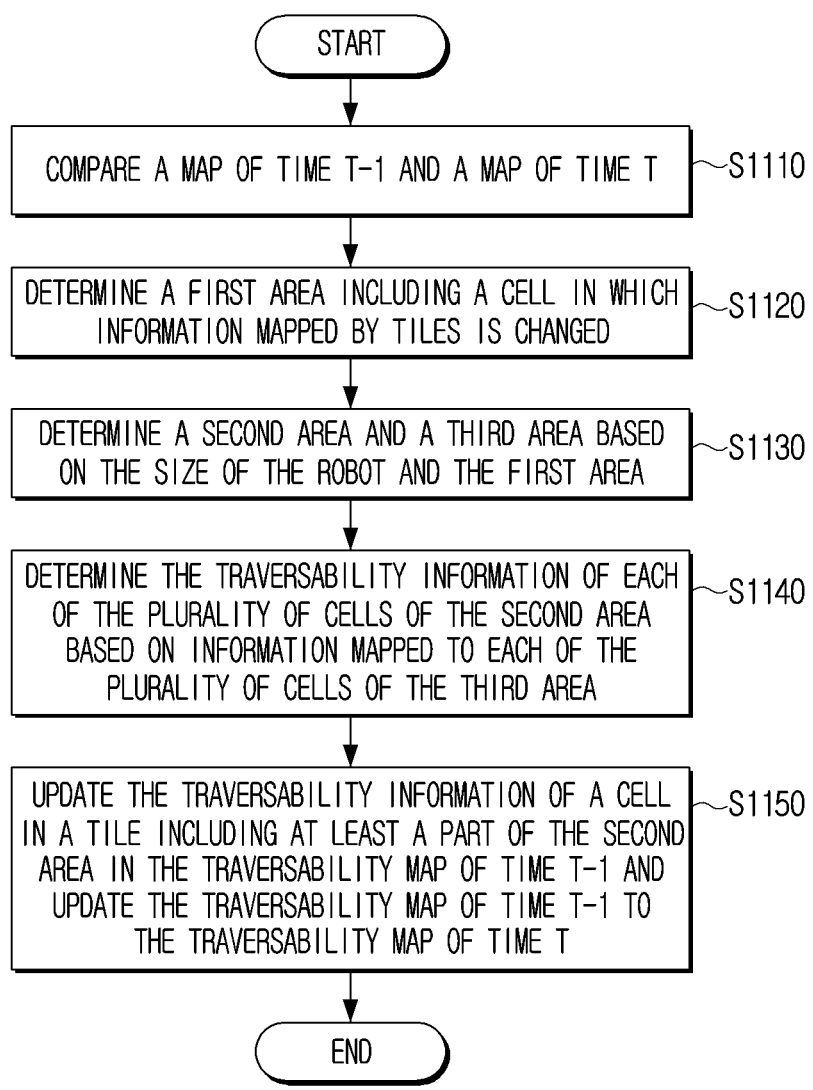
FIG. 11 is a flowchart illustrating a method for updating a traversability map according to an embodiment of the disclosure.

FIG. 11 is a flowchart illustrating a method for updating a traversability map according to an embodiment of the disclosure.

Figure 12:
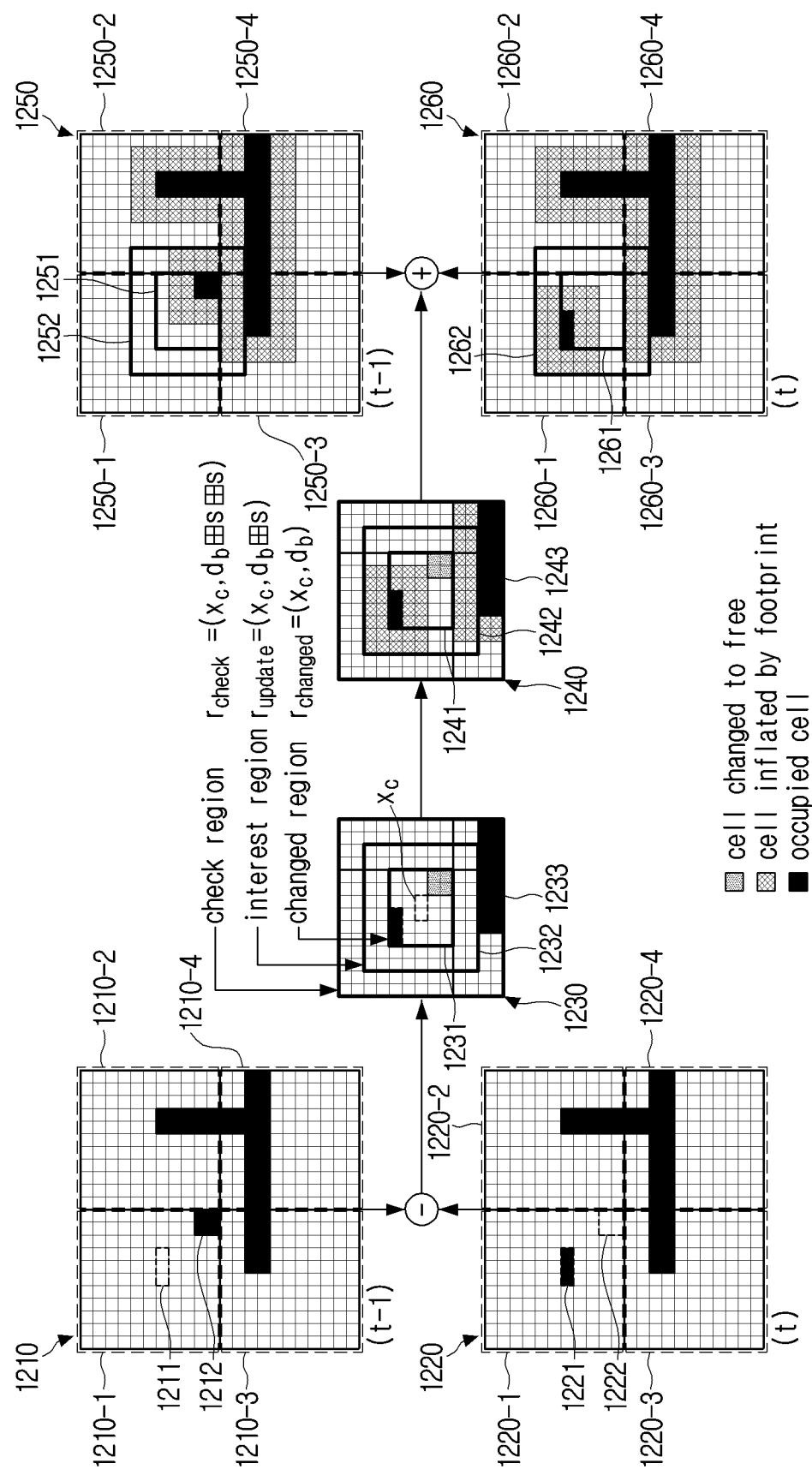
FIG. 12 is a view illustrating a method for updating a traversability map according to an embodiment of the disclosure.

FIG. 12 is a view illustrating a method for updating a traversability map according to an embodiment of the disclosure.

Referring to FIGS. 11 and 12, the processor 130 according to an embodiment may determine at least one cell of which information mapped to a cell is changed, by comparing information mapped to the pre-generated map 10 and information mapped to an updated map by a cell unit in operation S1110.

Referring to FIG. 12, an occupancy map 1220 of the time t is an updated map in which the occupancy map 1210 of the time t−1 is updated based on the subsequent sensing data. That is, tiles 1220-1 to 1220-4 of the occupancy map 1220 for time t are updated tiles in which tiles 1220-1 to 1210-4 of the occupancy map 1210 for time t−1. This may represent that, even though the first object is not present in a first cell 1211 of t−1 occupancy map 1210, the object is present in the first cell 1221 of the t occupancy map 1220 and thus, the occupancy state of the object is changed, and that the second object is present in a second cell 1212 of the t−1 occupancy map 1210, the object is not present in the second cell 1222 of the t occupancy map 1220 so that the occupancy state of the object is changed.

In this case, the processor 130 may compare the information mapped to the occupancy map 1210 of the time t−1 and the information mapped to the occupancy map 1220 of the time t in a cell unit, and determine at least one cell in which the information mapped to the cell is changed. For example, the processor 130 may perform a subtraction calculation of occupancy map 1210 of the time t−1 and the occupancy map 1220 of the time t, and determine a cell of which a difference value according to calculation is greater than or equal to a preset value (e.g., 0.5, etc.) as a cell of which information mapped to a cell is changed. Hereinafter, the present disclosure will be described with reference to regions 1230 and 1240 indicating a comparison between the t−1 occupancy map 1210 and the t occupancy map 1220 for each tile (or cell).

The processor 130 can determine a first area of a minimum size including at least one cell in which information mapped to a cell is changed in each tile by each tile of the updated map in operation S1120. Here, the first area can represent an area having a minimum size in which the occupied state and the like is changed in a tile unit.

For example, referring to the region 1230 of FIG. 12, the processor 130 can determine a first area 1231 of a minimum size including the cells 1221 and 1222 whose information mapped in each tile is changed in each tile 1220-1 to 1220-4 by each tile 1220-1 to 1220-4 of the updated map 1220. Here, the first area 1231 is grouped so that the area including the cells 1221 and 1222 in which the mapped information is changed has a minimum size. When a cell whose mapped information is changed is present in the first tile 1220-1 and the second tile 1220-2, the first area may be determined by grouping the cells in which mapped information is changed in the first tile 1220-1 and the cells in which mapped information is changed in the second tile 1220-2.

The processor 130 can determine a second area 1232 including the first area 1231 and a third area 1233 including the second area 1232 based on the size of the robot 200 within each tile 1220-1 to 1220-4 by each tile 1220-1 to 1220-4 of the updated map 1220 in operation S1130.

The processor 130 can determine the second area 1232 and the third area 1233 based on the size of the robot 200 and the first area 1231. Here, the second area 1232 is an area for updating the traversability information and can be named an interest area 1232. A third area 1333 is an area which influences whether the robot 200 is traversable in the second area 1232, and may be referred to as a check area 1333.

For example, referring to the regions 1230 and 1240 of FIG. 12, it is assumed that the size of the robot 200 corresponds to the size of two cells. The processor 130 can determine an area extending the first areas 1231 and 1241 from a center (x$_c$) to the first areas 1231 and 1241 of the robot 200 to a size of one time larger than the robot 200 as second areas 1232 and 1242. In addition, the processor 130 can determine the area extending the first areas 1231 and 1241 from the center (xc) of the first areas 1231 and 1241 to a size of two times larger than the robot 200 as third areas 1233 and 1243. Here, the size of the second areas 1232 and 1242 and the third areas 1233 and 1243 extends is only one embodiment, and various modifications can be made.

The processor 130 can determine the traversability information of each of the plurality of cells of the second area 1242 based on information mapped to each of the plurality of cells of the third area 1243 and the size of the robot 200 in operation S1140. The traversability information of the second area 1242 may be influenced by first area in which environment (e.g., occupancy state of an object, etc.) is directly changed and information mapped to a third area 1243 (e.g., the area excluding the second area 1242 from among the third area 1243) and this point is considered. The specific operation is omitted in that it is redundant with the descriptions of FIGS. 5 to 7.

The processor 130 can update the traversability information mapped to at least one cell included in at least one tile in a pre-generated traversability map 1250 based on the determined traversability information of the second area 1242. That is, the processor 130 may update the traversability information of a cell in a tile including at least a part of the second area 1252 in the pre-generated traversability map 1250 to update the generated traversability map 1250 in operation S1150.

Specifically, referring to FIG. 12, the processor 130 can determine at least one tile 1250-1 to 1250-4 including at least one cell of a second area 1252 among a tile 1250-1 of the pre-generated traversability map 1250 and at least one tile 1250-2 to 1250-4 around the tile 1250-1. For example, the first to fourth tiles 1250-1 to 1250-4, which include even a part of the cells of the second area 1252, as shown in FIG. 12, can be determined.

The processor 130 can update the traversability information mapped to at least one cell of the determined tiles 1250-1 to 1250-4 of the pre-generated traversability map 1250 based on the determined traversability information of the second area 1242. For example, the pre-generated traversability map 1250 may be updated as a traversability map 1260 by remapping through replacement of pre-mapped traversability information to a cell corresponding to the determined traversability information of the second area 1242. That is, the second area 1262 of the updated traversability map 1260 may be obtained from the second area 1242 of the area 1240. The remaining area of the updated traversability map 1260 may be obtained from remaining areas of the pre-generated traversability map 1250 except the second area 1252 of the pre-generated traversability map 1250. In this case, an update unit of the updated traversability map 1260 may be the second area 1262 or the tiles 1260-1 to 1260-4 including the second area 1262. As described above, according to an exemplary embodiment of the present disclosure, the traversability maps 1250 and 1260 are the second regions 1252 and 1262 that are extended from the first regions 1251 and 1261 whose occupancy state is changed in consideration of the size of the robot 200, the drivability information can be updated. As described above, according to an embodiment of the present disclosure, traversability information for the first regions 1251 and 1261 of the traversability maps 1250 and 1260 in which the occupancy state is changed is updated. In addition, traversability information may be updated for the second regions 1252 and 1262 extended from the first region based on the size of the robot 200.

Figure 13:
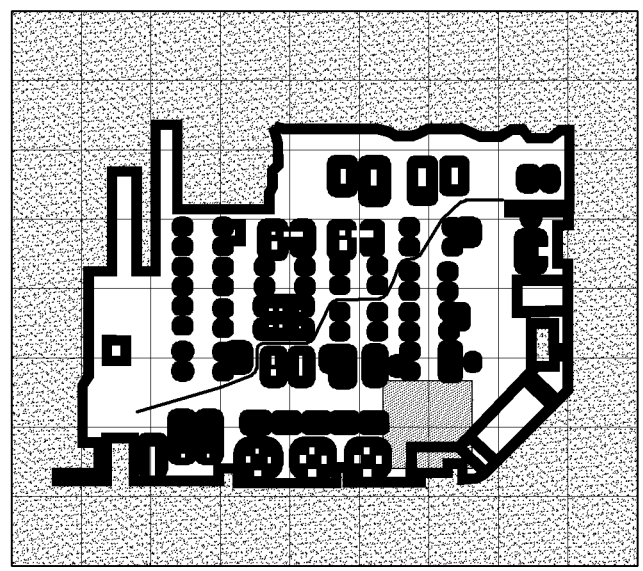
FIG. 13 is a view illustrating a result of updating a traversability map according to an embodiment of the disclosure.
Figure 13:
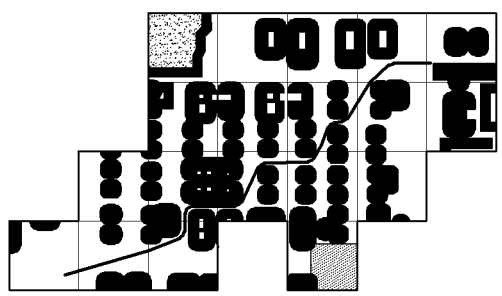

FIG. 13 is a view illustrating a result of updating a traversability map according to an embodiment of the disclosure.

Part (1) of FIG. 13 illustrates path planning by generating and updating a traversability map for an entire area in a manner according to the related art.

Part (2) of FIG. 13 illustrates path planning by generating and updating the traversability map based on a tile (or cell) according to an embodiment, and evaluating a memory usage and elapsed time on a workstation having an Intel i7-7700 CPU.

The occupancy map for the generation of traversability map has been built by the SLAM based LiDAR in an indoor environment of a Samsung Megastore, specifically the size of the cell is five centimeters, and the size of the map is 45 meters×40 meters. The size of the tile is five meters, and each tile includes 100×100 cells. In addition, to evaluate the performance of the update, the occupancy map has been set to be periodically changed. Also, a D*Lite algorithm is used for gradual path planning, and a departure location and a destination are respectively set on the left lower side and right upper sides of the map to find the longest path on the map.

Referring to part (2) of FIG. 13, a tile of traversability map with a cell is generated based on data sensed in an external device (e.g., a robot). As summarized in part (2) of FIG. 13, since 19 tiles that are 26.38% of the entire map have been used, the proposed method requires a data throughput of 190 KB, while a related-art method has required a data throughput of 720 KB. In addition, the data processing takes 0.7224 seconds, which is 26.54% of the time required according to the related-art method. This is because the traversability information of only the tiles corresponding to the required cell is timely generated, instead of calculating traversability information of the entire cells. In the proposed method, 0.0303 seconds are taken to update a map, which is 18.76% of the time required in accordance with the related-art method. This is because the proposed method only updates a tile corresponding to an area in which an occupied state, or the like, is changed.

Figure 14:
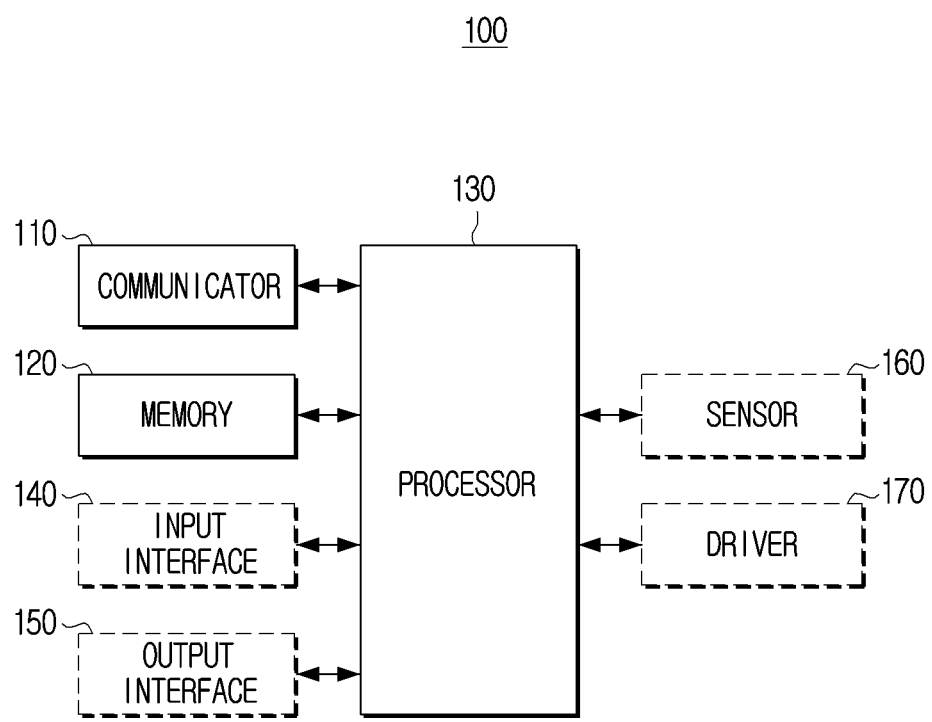
FIG. 14 is a block diagram illustrating an additional configuration of an electronic apparatus according to an embodiment of the disclosure.

FIG. 14 is a block diagram illustrating an additional configuration of an electronic apparatus according to an embodiment of the disclosure.

Referring to FIG. 14, the electronic apparatus 100 according to one embodiment may further include at least one of an input interface 140, an output interface 150, a sensor 160, and a driver 170, in addition to the communicator 110, the memory 120, and the processor 130.

The memory 120 is configured to store various data related to elements of the electronic apparatus 100 and an operating system (OS) for controlling overall operations of the elements of the electronic apparatus 100.

The memory 120 may be formed of hardware that temporarily or permanently stores data or store. For example, the memory 120 may be implemented as at least one hardware among a non-volatile memory, a volatile memory, a flash memory, a hard disk drive (HDD) or solid state drive (SSD), random access memory (RAM), read-only memory (ROM), or the like.

The memory 120 may store at least one instruction, program, or data used for operation of the electronic apparatus 100 or the processor 130. The instruction is a code unit that directs the operation of the electronic apparatus 100 or the processor 130, and may be written in a machine language that can be understood by a computer. A program may be an instruction set of a series of instructions that perform a particular task of a task unit. The data may be status information in bit unit or byte unit that may represent characters, numbers, images, or the like.

The processor 130 may be implemented as a general-use processor such as a central processing unit (CPU), an application processor (AP), a graphics-only processor such as a graphics processing unit (GPU), a vision processing unit (VPU), or the like, or an artificial intelligence (AI)-only processor such as a neural processing unit (NPU). The processor 130 may include a volatile memory for loading at least one instruction or module.

The input interface 140 may receive various user commands and pass the same to the processor 130. The processor 130 can recognize a user command input from a user through the input interface 140. Here, the user command can be implemented in various ways, such as a user's touch input (touch panel), a key (keyboard) or a button (physical button or mouse, etc.) input, user voice (microphone), or the like.

The output interface 150 is configured to output information and may be implemented as, for example, a display, a speaker, or the like. The display is a device that visually outputs information or data. The display may display an image frame in all or a portion of the display area that can be driven in a pixel unit. At least a portion of the display may be coupled to at least one of a front area and a side area and a back area of the electronic apparatus 100 in the form of a flexible display. The flexible display may be characterized as being bent, curved, or rolled without a damage through a paper-like thin and flexible substrate. The speaker may directly output various notification sound or voice messages as well as various audio data for which various processing has been performed, such as decoding or amplification, noise filtering, etc., by an audio processor (not shown) as voice.

The sensor 160 can be implemented with various sensors, such as a camera, a microphone, a proximity sensor, an illuminance sensor, a motion sensor, a time of flight (ToF) sensor, a global positioning system (GPS) sensor, an indoor positioning system (IPS), and the like. For example, the camera may divide the light in pixel units, detect the intensity of light for red (R), green (G), and blue (B) for each pixel, and convert the intensity of the light into an electrical signal to obtain data representing the color, shape, contrast, or the like, of the object. At this time, the type of data can be an image having R, G, and B color values for each of the plurality of pixels. The microphone may sense a sound wave, such as a voice of a user, and convert the sound wave into an electrical signal to obtain data. At this time, the type of data can be an audio signal in various formats. The proximity sensor may sense the presence of the surrounding object to obtain data about the presence of a surrounding object or the proximity of the surrounding object. The illuminance sensor may sense light quantity (or brightness) relative to the surrounding environment of the electronic apparatus 100 to obtain data for the illuminance. The motion sensor can sense movement distance, movement direction, incline, or the like, of the electronic apparatus 100. The motion sensor can be implemented in a combination of an acceleration sensor, a gyro sensor, a geomagnetic sensor, or the like. A TOF sensor may detect a flight time of emitting and returning the various electromagnetic waves (e.g., ultrasound, infrared, laser, etc.) having a specific speed, and may obtain data with respect to a distance (or location) with the object. The GPS sensor may receive a radio wave signal from a plurality of satellites, calculate a distance with each satellite by using a transmission time of the received signal, and obtain data for the current location of the electronic apparatus 100 by using the calculated distance through triangulation. The IPS sensor may receive a radio wave signal from a plurality of access points (APs) which perform communication of various kinds of communication schemes (e.g., Wi-Fi, Bluetooth, ZigBee, ultra-wideband (UWB), etc.), calculate the distances from each AP using the transmission time of the received radio wave signal, and obtain data for the current location of the electronic apparatus 100 by using the distance of each AP and the electronic apparatus 100 through triangulation. Here, it is also possible to perform the operation of the above-described IPS by the communicator 110 replacing the IPS sensor. The above-described implementation embodiment of the sensor 160 is only one embodiment, and it is not limited thereto, and it is possible to implement various types of sensors.

The driver 170 represents a device for enabling the robot 200 to traverse. For example, the driver 170 may include a driving device for generating a driving force so that the robot 200 can traverse; a steering device enabling the robot 200 to adjust the traverse direction; and a power supply unit supplying energy to the driving device, or the like. However, according to one embodiment, the robot 200 can be modified according to the traverse type (e.g., wheel type, walking type, flight type, etc.).

Figure 15:
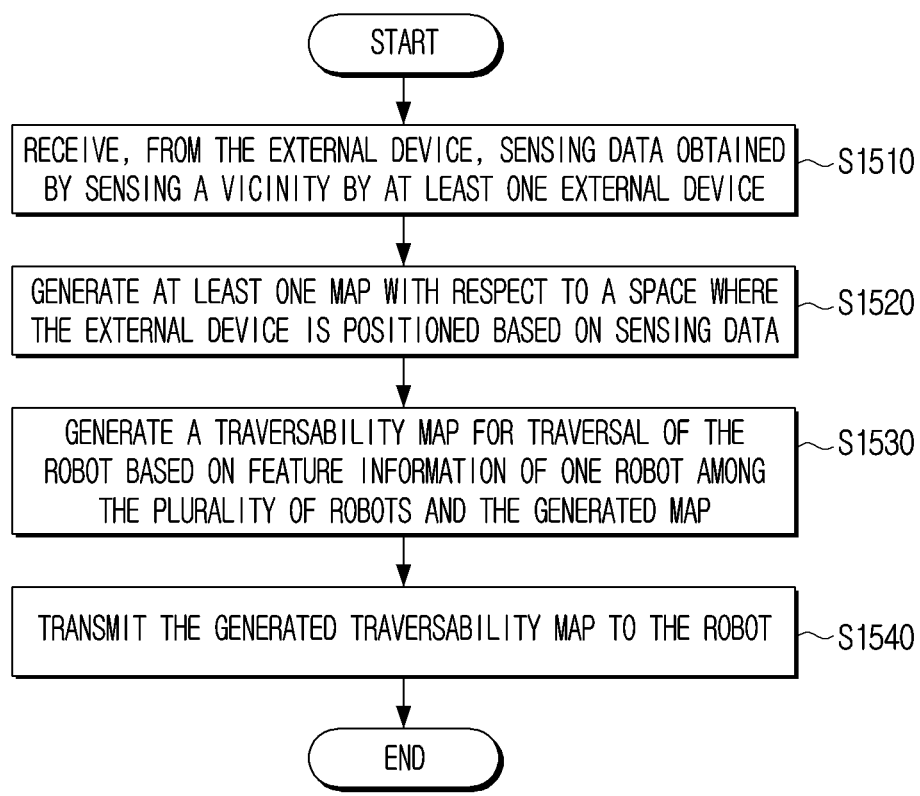
FIG. 15 is a flowchart illustrating a controlling method of an electronic apparatus according to an embodiment of the disclosure.

FIG. 15 is a flowchart illustrating a controlling method of an electronic apparatus according to an embodiment of the disclosure.

Referring to FIG. 15, the controlling method of the electronic apparatus 100 according to one embodiment may include receiving, from the external device 300, sensing data obtained by sensing a vicinity by at least one external device 300 in operation S1510, generating at least one map with respect to a space where the external device 300 is positioned based on sensing data in operation S1520, generating a traversability map for traversal of the robot 200 based on feature information of one robot 200 among the plurality of robots and the generated map in operation S1530 and transmitting the generated traversability map to the robot 200 in operation S1540.

Specifically, the electronic apparatus 100 can receive the sensing data obtained by sensing the vicinity of the at least one external device 300 from the external device 300 in operation S1510.

The electronic apparatus 100 may pre-store the feature information of each of the plurality of robots. Here, the feature information of each of the plurality of robots may include information about the size, height, and traverse type of each of the plurality of robots. The traverse type can be at least one of a wheel type, a flight type, or a walking type.

At least one map for a space in which the external device 300 is positioned may be generated based on sensing data in operation S1520.

Here, the at least one map may include at least one of a map including a plurality of cells mapped with probability information on which an object exists, and a map including a plurality of cells mapped with height information indicating the height of the object.

According to an embodiment, the at least one map may include at least one of a map including a plurality of cells mapped to information about an area, and a map including a plurality of cells mapped with information about the direction and intensity of the magnetic field.

The traversability map for traversal of the robot 200 can be generated based on the feature information of one robot 200 among the plurality of robots and the generated map in operation S1530.

The generating the traversability map can determine whether the robot 200 is traversable in each of the plurality of cells based on the information mapped to each of the plurality of cells and the feature information of the robot 200. In addition, a traversability map including a plurality of cells mapped with traversability information indicating whether the robot 200 is traversable can be generated.

Afterwards, the generated traversability map can be transmitted to the robot 200 in operation S1540. In this case, the traversability map of the robot 200 can be updated on a tile basis based on information received from the electronic apparatus 100.

The controlling method according to one embodiment can receive subsequent sensing data from the external device 300. Here, the subsequent sensing data can represent sensing data received (or sensed) after the previously received (or sensed) sensing data.

In this case, based on the subsequent sensing data, by updating at least one of the probability information and the height information mapped to at least one of the plurality of cells of the previously generated map, the previously generated map can be updated. Here, the previously generated map and the updated map indicate a temporal relationship over time. For example, a previously generated (or updated) map may be generated (or updated) at time t−1, and the updated map at this time may be updated at time t.

In this case, based on the previously generated map and the updated map, the traversability information mapped to at least one cell included in at least one tile among the plurality of tiles can be updated in a traversability map divided into a plurality of tiles. That is, by updating the previously generated (or updated) map, a previously generated (or updated) traversability map can also be updated.

Specifically, the information mapped to the generated map and information mapped to the updated map can be compared in a cell unit to determine at least one cell in which the mapped information is changed.

For each tile of the updated map, the first area of the minimum size including at least one cell of which mapped information in a tile is changed may be determined, and based on the size of the robot 200, the third area, including the second area and the second area, including the first area can be determined.

Based on information mapped to each of a plurality of cells of the third area and the size of the robot 200, the traversability information of each of the plurality of cells of the second area can be determined.

Based on the determined traversability information, traversability information mapped to at least one cell included in the at least one tile can be updated.

Here, among the tile and at least one tile around the tile, at least one tile including at least one cell of the second area can be determined, and based on the determined traversability information, the traversability information mapped to at least one cell of the determined tile may be updated. That is, the traversability map can be updated in a tile unit. In this case, in the traversability map, a tile of which even a part belongs to the second area can be updated. In an exemplary embodiment, it is possible that the cells belonging to the second area are updated.

The traversability information included in the updated tile can be transmitted to the robot 200 so that the robot 200 may update the traversability map.

Various embodiments may be implemented as software that includes instructions stored in machine-readable storage media readable by a machine (e.g., a computer). A device may call instructions from a storage medium and operate in accordance with the called instructions, including an electronic apparatus (e.g., the electronic apparatus 100). When the instruction is executed by a processor, the processor may perform the function corresponding to the instruction, either directly or under the control of the processor, using other components. The instructions may include a code generated by a compiler or a code executable by an interpreter. The machine-readable storage medium may be provided in the form of a non-transitory storage medium. The "non-transitory" storage medium may not include a signal and is tangible, but does not distinguish whether data is permanently or temporarily stored in a storage medium.

According to embodiments, a method disclosed herein may be provided in a computer program product. A computer program product may be traded between a seller and a purchaser as a commodity. A computer program product may be distributed in the form of a machine-readable storage medium (e.g., a CD-ROM) or distributed online through an application store (e.g., PLAYSTORE™). In the case of on-line distribution, at least a portion of the computer program product may be stored temporarily in a storage medium, such as a manufacturer's server, a server in an application store, a memory in a relay server, and the like, or temporarily generated.

Each of the components (for example, a module or a program) according to embodiments may include one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with the embodiments of the disclosure, may be performed sequentially, in a parallel, repetitive, or heuristic manner, or at least some operations may be performed in a different order, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
   a transceiver;
   a memory configured to store feature information of each of a plurality of robots, the feature information of each of the plurality of robots including information about a size and a height for each of the plurality of robots, a traversal type for each of the plurality of robots, and a type of a sensor included in each of the plurality of robots; and
   at least one processor configured to:
      control to receive, from at least one external device via the transceiver, sensing data obtained by the at least one external device,
      generate a first map including a plurality of cells mapped with a height information indicative of a height of an object with respect to a three dimensional space where the at least one external device is positioned based on the received sensing data,
      generate a second map including the plurality of cells mapped with information about a direction and an intensity of a magnetic field of each of the plurality of cells based on the received sensing data,
      identify whether a robot among the plurality of robots is traversable or not in each of the plurality of cells, based on the first map including the height information mapped to each of the plurality of cells and based on the size and the height of the robot and the traversal type of the robot that is included in the feature information of the robot,
      identify whether the robot is traversable or not in each of the plurality of cells, based on the second map including the information about the direction and the intensity of the magnetic field of each of the plurality of cells and based on the type of the sensor included in the robot that is included in the feature information of the robot,
      generate a traversability map including the plurality of cells mapped with traversability information indicating whether the robot is traversable, based on the identification whether the robot is traversable or not in each of the plurality of cells based on the first map and based on the identification whether the robot is traversable or not in each of the plurality of cells based on the second map, and
      control to transmit, to the robot via the transceiver, the traversability map,
   wherein the traversability map is configured for the robot to traverse to a destination based on the traversability map.

2. The electronic apparatus of claim 1,
   wherein the at least one processor is further configured to:
      generate a third map including the plurality of cells mapped with probability information about presence of an object, and
   wherein the generation of the traversability map is further based on the third map.

3. The electronic apparatus of claim 2, wherein the at least one processor is further configured to:
- control to receive, from the at least one external device via the transceiver, subsequent sensing data, and
- update the at least one of the generated first, second, or third map by updating at least one of height information or probability information mapped to at least one cell among the plurality of cells of the at least one of the generated first, second, or third map based on the subsequent sensing data.

4. The electronic apparatus of claim 3, wherein the at least one processor is further configured to:
- based on the at least one of the generated first, second, or third map and the at least one of the updated first, second, or third map, update the traversability map mapped to the at least one cell included in at least one tile among a plurality of tiles in the traversability map that is divided by the plurality of tiles, and
- control to transmit, to the robot via the transceiver, traversability information included in an updated tile to enable the robot to update the traversability map.

5. The electronic apparatus of claim 4, wherein the at least one processor is further configured to:
- identify at least one cell of which mapped information is changed by comparing information mapped to the at least one of the generated first, second, or third map and information mapped to the at least one of the updated first, second, or third map on a cell unit,
- identify a first area including at least one cell of which the mapped information is changed in a tile, by each tile of the at least one of the updated first, second, or third map,
- identify a second area including the first area and a third area including the second area based on the size of the robot,
- identify traversability information of each of a plurality of cells of the second area based on the size of the robot and information mapped to each of a plurality of cells of the third area, and
- update traversability information mapped to at least one cell included in the at least one tile based on the identified traversability information.

6. The electronic apparatus of claim 5, wherein the at least one processor is further configured to:
- identify at least one tile including at least one cell of the second area among the tile and at least one tile in a vicinity of the tile, and
- update traversability information mapped to at least one cell of the identified at least one tile based on the identified traversability information.

7. The electronic apparatus of claim 2,
wherein the at least one processor is further configured to:
- generate a fourth map including the plurality of cells mapped with information about a zone of each of the plurality of cells, and
- wherein the generation of the traversability map is further based on the fourth map.

8. The electronic apparatus of claim 1, wherein the traversal type for each of the plurality of robots corresponds to one of a wheel type, a flight type, or a walking type.

9. A method performed by an electronic apparatus that stores feature information of each of a plurality of robots, the feature information of each of the plurality of robots including information about a size and a height for each of the plurality of robots and a traversal type for each of the plurality of robots, and a type of a sensor included in each of the plurality of robots, the method comprising:
- receiving, from at least one external device, sensing data obtained by the at least one external device;
- generating a first map including a plurality of cells mapped with a height information indicative of a height of an object with respect to a three dimensional space where the at least one external device is positioned based on the received sensing data;
- generating a second map including the plurality of cells mapped with information about a direction and an intensity of a magnetic field of each of the plurality of cells based on the received sensing data;
- identifying whether a robot among the plurality of robots is traversable or not in each of the plurality of cells, based on the first map including the height information mapped to each of the plurality of cells and based on the size and the height of the robot and the traversal type of the robot that is included in the feature information of the robot;
- identifying whether the robot is traversable or not in each of the plurality of cells, based on the second map including the information about the direction and the intensity of the magnetic field of each of the plurality of cells and based on the type of the sensor included in the robot that is included in the feature information of the robot;
- generating a traversability map for traversal of a robot including the plurality of cells mapped with traversability information indicating whether the robot is traversable, based on the identifying whether the robot is traversable or not in each of the plurality of cells based on the first map and based on the identifying whether the robot is traversable or not in each of the plurality of cells based on the second map; and
- transmitting, to the robot, the generated traversability map,
- wherein the traversability map is configured for the robot to traverse to a destination based on the traversability map.

10. The method of claim 9, further comprising:
- generating a third map including the plurality of cells mapped with probability information about presence of an object,
- wherein the generating of the traversability map is further based on the third map.

11. The method of claim 10, further comprising:
- receiving, from the external device, subsequent sensing data through a transceiver; and
- updating the at least one of the generated first, second, or third map by updating at least one of height information or probability information mapped to at least one cell among the plurality of cells of the at least one of the generated first, second, or third map based on the subsequent sensing data.

12. The method of claim 11, further comprising:
- based on the at least one of the generated first, second, or third map and the at least one of the updated first, second, or third map, updating the traversability map mapped to the at least one cell included in at least one tile among a plurality of tiles in the traversability map that is divided by the plurality of tiles; and
- transmitting, to the robot, traversability information included in an updated tile to enable the robot to update the traversability map.

13. The method of claim 12, wherein the updating of the traversability map comprises:
- identifying at least one cell of which mapped information is changed by comparing information mapped to the at least one of the generated first, second, or third map and information mapped to the at least one of the updated first, second, or third map on a cell unit;

identifying a first area including at least one cell of which the mapped information is changed in a tile, by each tile of the at least one of the updated first, second, or third map;

identifying a second area including the first area and a third area including the second area based on the size of the robot;

identifying traversability information of each of a plurality of cells of the second area based on the size of the robot and information mapped to each of a plurality of cells of the third area; and updating traversability information mapped to at least one cell included in the at least one tile based on the identified traversability information.

14. The method of claim 13, wherein the updating of the traversability information comprises:

identifying at least one tile including at least one cell of the second area among the tile and at least one tile in a vicinity of the tile; and updating traversability information mapped to at least one cell of the identified at least one tile based on the identified traversability information.

15. The method of claim 10, further comprising:

generating a fourth map including the plurality of cells mapped with information about a zone of each of the plurality of cells, wherein the generating of the traversability map is further based on the fourth map.

16. The method of claim 9, wherein the traversal type for each of the plurality of robots corresponds to one of of a wheel type, a flight type, or a walking type.

17. The method of claim 16, wherein the wheel type relates to movement through rotation, wherein the flight type relates to movement above a ground surface, and wherein the walking type relates to movement of two or more legs.

18. The method of claim 10, wherein the size of the robot affects a traversable area of the robot.

* * * * *